US009383804B2

(12) United States Patent
Salsbery et al.

(10) Patent No.: US 9,383,804 B2
(45) Date of Patent: Jul. 5, 2016

(54) METHOD AND SYSTEM FOR REDUCING THERMAL LOAD BY FORCED POWER COLLAPSE

(75) Inventors: Brian Salsbery, Superior, CO (US); Christopher Lee Medrano, Longmont, CO (US)

(73) Assignee: QUALCOMM Incorporated, San Diego, CA (US)

( * ) Notice: Subject to any disclaimer, the term of this patent is extended or adjusted under 35 U.S.C. 154(b) by 555 days.

(21) Appl. No.: 13/182,940

(22) Filed: Jul. 14, 2011

(65) Prior Publication Data

US 2013/0019120 A1 Jan. 17, 2013

(51) Int. Cl.
G06F 1/00 (2006.01)
G06F 1/04 (2006.01)
G06F 1/32 (2006.01)
G06F 1/20 (2006.01)
G06F 1/08 (2006.01)

(52) U.S. Cl.
CPC .............. G06F 1/3237 (2013.01); G06F 1/203 (2013.01); G06F 1/324 (2013.01); G06F 1/3287 (2013.01); G06F 1/08 (2013.01); Y02B 60/1217 (2013.01); Y02B 60/1221 (2013.01); Y02B 60/1282 (2013.01)

(58) Field of Classification Search
CPC .............. G06F 9/26; G06F 1/26; G06F 1/32; G06F 9/32
USPC .................................. 713/300, 324, 340, 500
See application file for complete search history.

(56) References Cited

U.S. PATENT DOCUMENTS 5,590,061 A * 12/1996 Hollowell et al. ............ 702/130
5,737,588 A 4/1998 Maeda et al.
(Continued)

FOREIGN PATENT DOCUMENTS

CN 1512293 A 7/2004
GB 2395309 A 5/2004
(Continued)

OTHER PUBLICATIONS

International Search Report and Written Opinion—PCT/US2012/043077—ISA/EPO—Sep. 6, 2012.
(Continued)

*Primary Examiner* — Phil Nguyen
(74) *Attorney, Agent, or Firm* — Nicholas A. Cole

(57) ABSTRACT

A system and method for reducing heat in a portable computing device includes clocking a processor such that it is provided with a full frequency over time $t_0$ to $t_1$. A timer is set to trigger a forced power collapse ("FPC") that removes all power to the processor from time $t_1$ to time $t_2$. At time $t_2$, the processor may be awakened such that it can resume processing at the full frequency. Advantageously, during the FPC, no leakage power ("$P_L$") is consumed by the processor between $t_1$ and $t_2$. The result is that the processor averages the same processing efficiency over time $t_0$ to $t_2$ as it otherwise would have if a reduced frequency had been provided to it. However, because no $P_L$ was consumed during the FPC, the generation of heat between time $t_1$ and $t_2$ that is related to $P_L$ is avoided.

40 Claims, 13 Drawing Sheets

(56) References Cited

U.S. PATENT DOCUMENTS

| | | | |
|---|---|---|---|
| 6,101,610 A * | 8/2000 | Beebe et al. | 713/323 |
| 6,792,550 B2 | 9/2004 | Osecky et al. | |
| 7,043,405 B2 | 5/2006 | Orenstien et al. | |
| 7,409,570 B2 | 8/2008 | Suzuoki | |
| 2002/0087907 A1 * | 7/2002 | Poisner | 713/340 |
| 2002/0095609 A1 * | 7/2002 | Tokunaga | 713/300 |
| 2005/0120252 A1 | 6/2005 | Uwatoko | |
| 2007/0067136 A1 | 3/2007 | Conroy et al. | |
| 2007/0076747 A1 * | 4/2007 | Zinaty | H04W 52/0225 370/463 |
| 2008/0022140 A1 | 1/2008 | Yamada et al. | |
| 2008/0168285 A1 * | 7/2008 | de Cesare et al. | 713/320 |
| 2008/0189071 A1 * | 8/2008 | Aguilar et al. | 702/130 |
| 2009/0177334 A1 * | 7/2009 | Artman et al. | 700/300 |
| 2009/0177445 A1 | 7/2009 | Capps et al. | |
| 2009/0243692 A1 * | 10/2009 | Chang | H03K 3/35613 327/333 |
| 2011/0018854 A1 * | 1/2011 | Barclay et al. | 345/211 |
| 2012/0331321 A1 * | 12/2012 | Kaburlasos et al. | 713/323 |
| 2013/0124890 A1 * | 5/2013 | Priel et al. | 713/320 |

FOREIGN PATENT DOCUMENTS

| | | |
|---|---|---|
| JP | 3264139 B2 | 3/2002 |
| JP | 2004164643 A | 6/2004 |
| JP | 2005165470 A | 6/2005 |
| JP | 2009506424 A | 2/2009 |
| JP | 2009231360 A | 10/2009 |
| JP | 2011129147 A | 6/2011 |
| KR | 20070105316 A | 10/2007 |

OTHER PUBLICATIONS

N N: "Timer—die Zeitschaltuhr starts your computer using the BIOS", Jan. 1, 2010, pp. 1-5, XP55036361, Retrieved from the Internet: URL : http://timerzeitschalt.sourceforge.net/en/index.html.

* cited by examiner

METHOD AND SYSTEM FOR REDUCING THERMAL LOAD BY FORCED POWER COLLAPSE

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. As such, instead of using fans to manage thermal energy generation, PCDs may rely on techniques that manipulate the voltage applied to its processors, thus saving power consumption that would otherwise generate excess heat.

One such technique is to "clock gate" a processor. Transistors switch between "charged" and "discharged" states as they provide active power ("$P_A$") to a processor. Therefore, temporarily disabling a transistor from switching between "charged" and "discharged" states, i.e. "clock gating," saves power and reduces power dissipation. That is, because switching states in a gate consumes power, "clocking" the gate eliminates the provision of active power to the processor, thereby reducing the amount of thermal energy that may be generated by the processor.

However, stopping all active power from being provided to a processor has no effect on the ongoing consumption of leakage power ("$P_L$"). Leakage power occurs even when a powered gate is not switching. In theory, current flow is restricted across a gate component but, due to the ever more compact circuitry in PCDs, gate geometry is trending to smaller and smaller designs. The result is that many gates used in PCDs today provide less effective physical barriers to current flow, thus making the consumption of leakage power more and more significant. To complicate matters, the compact circuitry may generate high amounts of thermal energy that further exacerbates the ability of an already thin gate to inhibit current flow.

The thermal contributions from active power, leakage power and external thermal sources can accumulate in a PCD until thermal runaway is reached. Thermal runaway may be defined as the point at which dissipation of leakage power alone will sustain or increase the temperature of the PCD. That is, at the point of thermal runaway, the current flowing through the PCD, even when the PCD is in an un-clocked state, is sufficient to either sustain the heat generation or cause it to increase. Currently, when a PCD approaches a critical temperature, such as a temperature associated with thermal runaway, the operating system may be designed to cool the PCD by simply shutting down most of the electronic components within the PCD. While shutting down electronics may be an effective measure for avoiding the continued generation of thermal energy within a PCD, such drastic measures inevitably impact performance of a PCD and, in some cases, may even render a PCD functionally inoperable for a period time.

Accordingly, what is needed in the art is a method and system for mitigating the consumption of leakage power in a PCD so that cooling of components is promoted within the PCD without over-impacting its performance and functionality.

SUMMARY OF THE DISCLOSURE

A method and system for reducing thermal energy generation in a portable computing device ("PCD") are disclosed. The method includes receiving directions to modify the throughput of a processing component within the PCD such that the active power ("$P_A$") consumption is reduced. Upon receipt of the directions, a calculation may be made to determine the number of instructions that the processing component may be operable to process at the modified frequency over a period of time from $t_0$ to $t_2$. Based on the determination, a clocking component within the PCD may be set such that the processing component of the PCD is provided with a frequency that enables it to process the determined number of instructions over a shorter period of time $t_0$ to $t_1$. Additionally, a timer component may be set to trigger a forced power collapse that removes all power to the processing component for a period of time beginning with a time $t_1$ and ending with a time $t_2$. Subsequent to the forced power collapse, at time $t_2$ the processing component may be awakened such that it can resume processing. Advantageously, during the forced power collapse, no leakage power ("$P_L$") is consumed by the processing component between times $t_1$ and $t_2$. The result is that the processing component averages the same processing throughput over time $t_0$ to $t_2$ as it would have if the initial directions to simply reduce the frequency had been implemented, however, because no $P_L$ was consumed during the forced power collapse, the generation of thermal energy related to $P_L$ that would have occurred between time $t_1$ and $t_2$ is avoided.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
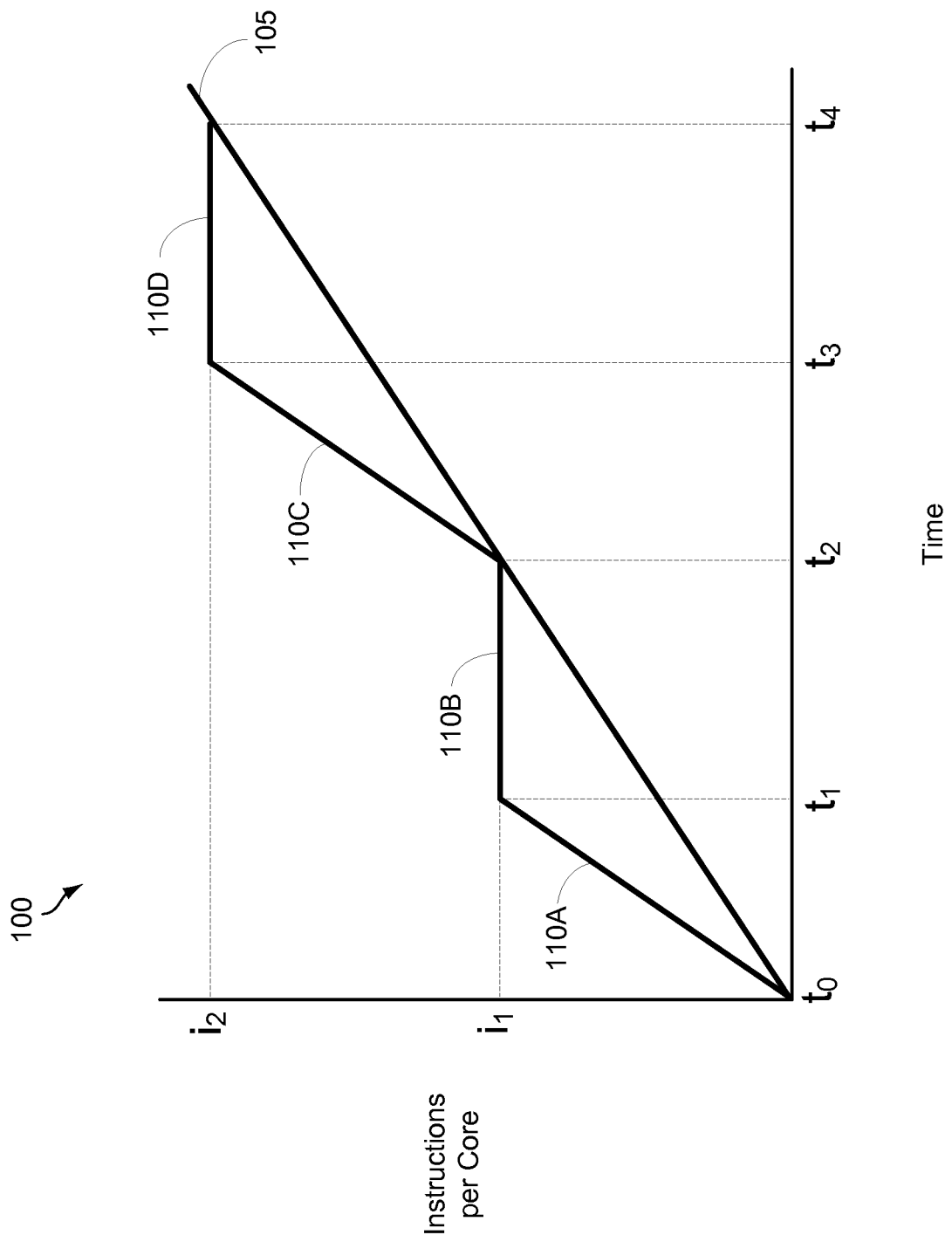
FIG. 1 is a graph of an exemplary a Forced Power Collapse ("FPC") curve representing a power cycle that may enable a PCD processor core to process an average number of MIPS that is equivalent to the number of MIPS that may be processed under a particular performance level.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content," as referred to herein, may also include files that are not executable in nature, such as documents that may need to be opened or other data files that need to be accessed.

As used in this description, the terms "component," "database," "module," "system," "thermal energy generating component," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device" and "wireless handset" are used interchangeably. With the advent of third generation ("3G") and fourth generation ("4G") wireless technology, greater bandwidth availability has enabled more portable computing devices with a greater variety of wireless capabilities.

In this description, the terms "central processing unit ("CPU")," "digital signal processor ("DSP")," and "chip" are used interchangeably.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal energy generating component" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processing component, one of ordinary skill in the art will acknowledge that use of these "thermal" terms in the present disclosure may be related to process load distributions, process burdens and process rates.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") wireless technology have enabled numerous PCDs with multiple capabilities. Therefore, a PCD may be a cellular telephone, a satellite telephone, a pager, a PDA, a smartphone, a navigation device, a smartbook or reader, a tablet computer, a media player, a combination of the aforementioned devices, a laptop computer with a wireless connection, among others.

In this description, the "processing capability," "processing efficiency," "throughput," "throughput degradation" or the like of a particular component may be quantified in terms of actual millions of instructions per second ("MIPS"), however, it will be understood by one of ordinary skill in the art that actual calculation of the number of MIPS that may be processed by a component, such as a core, may not be required in all embodiments. That is, in some embodiments, the processing capability in numbers of MIPS may be determined or calculated via inference, correlation or estimation. Moreover, in some embodiments, a component's processing capability may be represented in units other than MIPS such as, but not limited to, frequency reduction percentage, current draw reduction percentage, periods of time, etc. Therefore, one of ordinary skill in the art will recognize that any calculation or determination related to the processing capability of a component is envisioned by the scope of this disclosure.

In a typical scenario, a portable computing device ("PCD") may process a certain number of millions of instructions per second ("MIPS") by running a processing core at full processing power. When doing so, the core will consume a certain amount of power. This causes the dissipation of an associated amount of generated thermal energy. The thermal energy generated by a processing core running at full processing power may, or may not, be detrimental to the PCD. However, in the event that the thermal energy required to be dissipated is detrimental or potentially catastrophic to the PCD, counter measures may be taken to either reduce the workload burden on the processing core or reduce the power at which the core is running.

The energy consumed by an illustrative processing core running at full rated power is:

$$E=(FP_A \times t)+(P_L \times t)$$

where $FP_A$ is the active power consumed by the core running at full rated frequency, $P_L$ is the leakage power consumed by the circuitry associated with the core and t is time. Notably, the energy used by the illustrative core may be reduced, often at the expense of processing throughput, by "gating" the clock of the core such that the frequency of the power provided to the core is lowered. The effective result of gating is lower processing performance. Advantageously, thermal energy generation associated with $P_A$ consumption over a given period of time is also lowered as a result of the lower frequency. Essentially, when the core is being clocked, $P_A$ is consumed by the core and, when the core is not being clocked, no $P_A$ will be consumed. $P_L$ is consumed whether the gate is open or closed.

Accordingly, when the core is clocked at some rate less than the full frequency rating of the illustrative core, the energy consumed when the system is running is:

$$E=(P_A \times t)+(P_L \times t)$$

where $P_A$ is the active power consumed by the core running at a frequency lower than the full rated frequency, $P_L$ is the leakage power consumed by the circuitry associated with the core and t is time. And, when the core is not clocked, it is in a "ready" state but is not actively processing. Therefore, the energy consumed when a core is "ready" but not processing is:

$$E=(P_L \times t)$$

Notably, because $P_A$ is associated with a core frequency that is reduced below the full frequency at which the illustrative core is capable of running, one of ordinary skill in the art will recognize that the energy consumed by a core running at a lower frequency will be less than the energy consumed when the core is running at full power. That is, thermal effects may be mitigated by lowering the frequency provided to a core because doing so lowers the amount of $P_A$ consumed by the core.

$P_A$ is variable power consumption that is a function of the frequency level at which a given core is running Meanwhile, $P_L$ is a continuous, ongoing power consumption associated with powered processor circuitry and occurs whether a core is running or not. As such, one of ordinary skill in the art will recognize that reducing the frequency to a core will only serve to lower $P_A$ consumption—$P_L$ is consumed regardless of whether the core is drawing $P_A$. Over time, the ongoing dissipation of power may accumulate until a thermal runaway condition is reached. At the point of thermal runaway, the current flowing through the PCD, i.e. the continuous consumption of $P_L$ by the PCD, is sufficient to either sustain a level of heat generation already reached or cause it to increase.

To mitigate the potential for thermal runaway, various embodiments of a forced power collapse ("FPC") thermal mitigation technique may be employed. An FPC technique reduces the amount of $P_L$ that is consumed by a PCD over a given amount of time. By periodically shutting down a given core or a set of cores within the PCD while work is ready for processing, $P_L$ is not generated or consumed by the core during the period of shutdown thereby reducing otherwise unavoidable thermal energy generation associated with the $P_L$ constant.

In some embodiments of an FPC thermal mitigation system or method, a core may be allowed to run at full processing power for a shortened period of time before a forced power collapse is implemented. Notably, by running the core at its full processing power before applying a forced power collapse, the amount of MIPS processed by the core during the shortened processing time may be calculated to approximate the amount of MIPS the core would otherwise have processed over a longer processing time under a thermal mitigation technique that leverages a lower frequency. Advantageously, because the full processing power of the core is leveraged (or, at least, a processing power level exceeding some lower frequency associated with an alternative thermal mitigation technique), a given amount of MIPS may be processed over a shorter time than would otherwise be required for the core when running at a lower frequency. Thus, a forced power collapse may be implemented for a period equivalent to the difference in processing time thereby avoiding the thermal energy that would have been generated as a result of $P_L$ consumed during such difference in processing time.

FIG. 1 is a graph 100 of an exemplary FPC curve 110 representing a power cycle that may enable a PCD processor core 710 to process an average number of MIPS that is equivalent to the number of MIPS that may be processed under a particular clocked power curve 105. Notably, one of ordinary skill in the art will understand that reference to a particular "clocked power curve" in this description may be tantamount to referencing a particular "performance level." Moreover, one of ordinary skill in the art will recognize that a particular "performance level" necessarily correlates with a particular processing capability.

It is envisioned that in some embodiments a thermal policy manager 701 in concert with a monitor module 714 (See FIG. 7) may detect an increase in thermal energy generation on chip 702 and seek to apply a thermal mitigation technique that directs a reduction in processing frequency at CPU 710. The particular clocked power cycle 105 may be representative of such a thermal mitigation technique that reduces thermal energy generation by reducing the frequency provided to CPU 710. As explained above, further reduction in heat generation may be realized over a particular clocked power cycle 105, without sacrificing processing throughput, by alternatively implementing an FPC thermal mitigation technique.

Referring to graph 100 of the FIG. 1, clocked power curve 105 may be compared to exemplary FPC curve 110. For the purpose of illustration, it may be assumed that clocked power cycle 105 and FPC curve 110 are implemented on identical processing cores "clocked core" and "FPC core," respectively; however, one of ordinary skill in the art will recognize that not all embodiments are directed toward processing cores and, as such, clocked power curve 105 may represent a target processing efficiency of a component other than a core of PCD 700.

Returning to the illustration, between time $t_0$ and time $t_2$, the clocked core may process $I_1$ instructions and consume an amount of energy equal to $(P_A \times t_2)$ plus $(P_L \times t_2)$. The FPC core, by leveraging a higher processing frequency over curve portion 110A, may consume substantially the same amount of active power over shorter time $t_1$ as the clocked core did over longer time $t_2$. Therefore, because the FPC core was able to process $I_1$ instructions over shorter time $t_1$, the FPC core may be subjected to a forced power collapse between time $t_1$ and $t_2$. As such, over curve portion 110B, the FPC core consumes no $P_L$, thus the energy consumed by the FPC core is equal to $(FP_A \times t_1)$ plus $(P_L \times t_1)$, where $(FP_A \times t_1)$ is essentially equivalent to $(P_A \times t_2)$ or, at least, exceeds $(P_A \times t_2)$ by an amount less than $(P_L \times (t_2 - t_1))$. Advantageously, the end result is that the FPC core may process the same amount of instructions $I_1$ over time $t_2$ as the clocked core without unnecessarily consuming and dissipating an amount of power equal to $(P_L \times (t_2 - t_1))$.

In the exemplary graph 100, it can be seen that the cycle described above is repeated beginning at time $t_2$. The FPC core is awakened from the forced power collapse at time $t_2$ and a full frequency is provided over curve portion 110C until time $t_3$. At time $t_3$, $I_2$ instructions have been processed by the FPC core and a second forced power collapse may be implemented between time $t_3$ and time $t_4$. The cycle may be repeated, with $P_L$ consumption avoided at every cycle, until the thermal mitigation technique is removed or amended.

Notably, for exemplary purposes, the FPC core is described as being provided with a full frequency along curve portions 110A and 110C. As such, one of ordinary skill in the art will recognize that an FPC thermal mitigation technique may be implemented where the provided frequency is something less than the full frequency rating of the processor but more than the clocked frequency suggested by an alternative thermal mitigation algorithm. Accordingly, an FPC thermal mitigation system or method will not be limited to the provision of a full frequency during the processing periods between forced power collapses.

Additionally, although the exemplary FPC thermal mitigation method described above is predicated upon an opportunity to save $P_L$ consumption without sacrificing processing efficiency beyond that of a suggested clock frequency, it will be understood that the impetus for applying other FPC thermal mitigation algorithms may be predicated on an opportunity to run at a higher processing efficiency without exceeding a thermal energy generation rate associated with a suggested clock frequency. That is, it is envisioned that various FPC thermal mitigation techniques may be implemented for the purpose of minimizing power consumption at a given processing efficiency while other FPC thermal mitigation techniques may be implemented for the purpose of maximizing processing efficiency at an acceptable rate of thermal energy generation.

Figure 2:
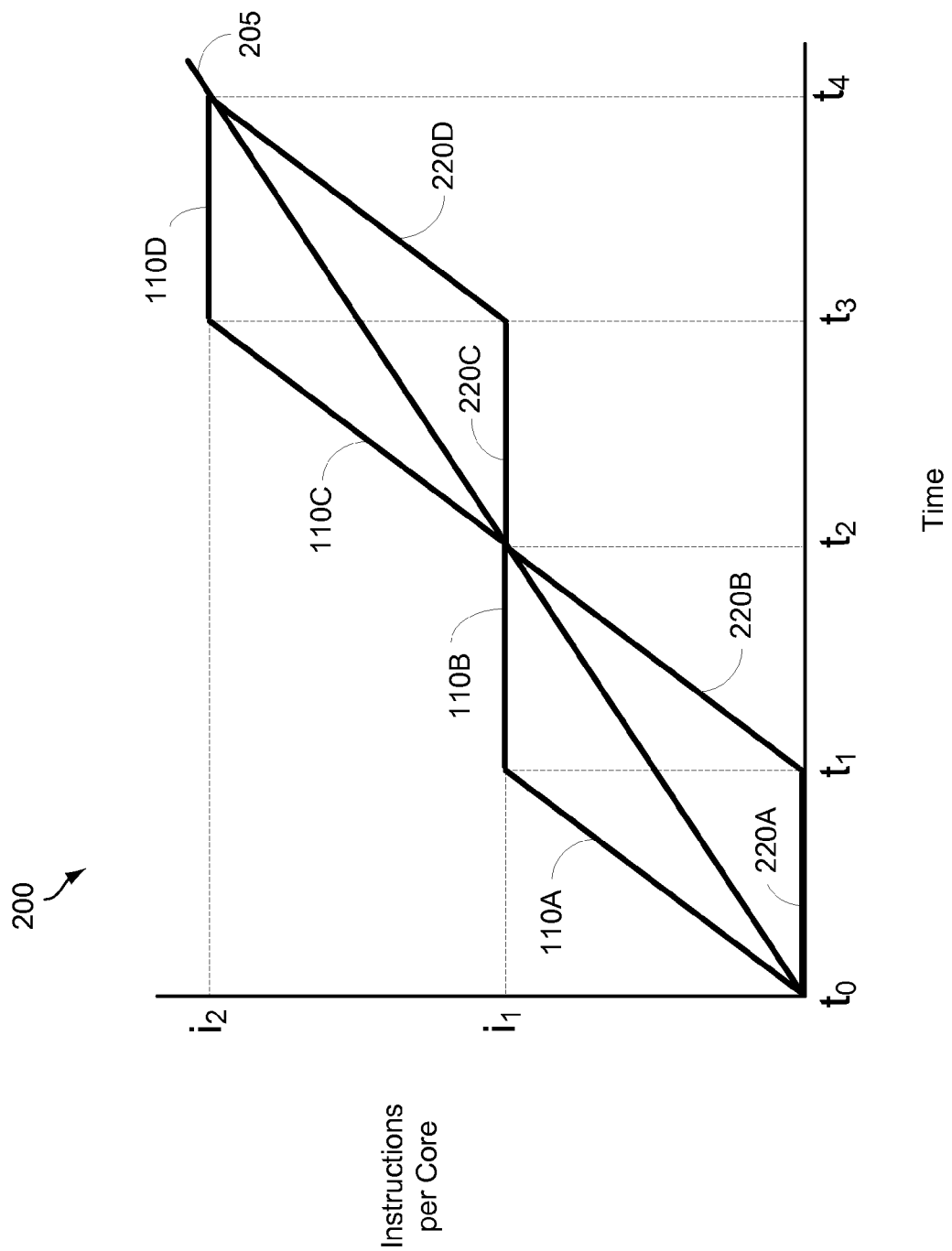
FIG. 2 is a graph of a pair of exemplary FPC curves, each representing a power cycle that may enable a processor core in a multi-core PCD processor to process an average number of MIPS that is equivalent to the number of MIPS that may be processed under a particular performance level.

FIG. 2 is a graph 200 of a pair of exemplary FPC curves 110, 220, each representing a power cycle that may enable a processor core in a multi-core PCD processor 710 (See FIG. 7) to process an average number of MIPS that is equivalent to the number of MIPS that may be processed under a particular clocked power curve 205. Notably, one of ordinary skill in the art will recognize that curve 205 may also represent the average number of MIPS processed by each of the exemplary FPC power curves 110, 220. For illustrative purposes, FPC power curve 110 may be implemented on PCD 700, core 822 and FPC power curve 220 implemented on PCD 700, core 824.

As was described above relative to the FIG. 1 graph 100, the application of FPC power curve 110 to core 822 may cause core 822 to process instructions at a full frequency over curve portion 110A before being subjected to a forced power collapse between times $t_1$ and $t_2$. Advantageously, without having to dissipate $P_L$ between times $t_1$ and $t_2$, the application of FPC curve 110 to core 822 may cause core 822 to process substantially the same number of instructions $I_1$ over time $t_2$ that it would otherwise have processed per the application of clocked curve 205.

Notably, because core 822 is subjected to a forced power collapse along curve portions 110B and 110D, a user of PCD 700 may experience "jittery" quality of service ("QoS") in some implementations where $(t_2 - t_1)$ and $(t_4 - t_3)$ represent significant amounts of time. Consequently, it is envisioned that some embodiments of a FPC thermal mitigation technique may synchronize two or more cores 822, 824 such that the processing curve portions 220B, 220D of core 824 occur simultaneously with FPC curve portions 110B, 110D of core 822. Similarly, FPC curve portions 220A, 220C of core 824 may be timed to occur simultaneously with processing curve portions 110A, 110C of core 822. It is envisioned that the result of staggering complimentary FPC thermal mitigation curves over a pair or more of cores in processor 710 may provide a smooth QoS experience to a user at a processing level normally attributable to a single core running at a frequency associated with the slope of curve portions 110A, 220B, 110C and 220D. Moreover, in other embodiments, this jittery QoS effect may be mitigated by selecting times $t_0$, $t_1$ and $t_2$ such that the stutter that is inherent to "stop and start" processing is not noticeable to a user.

Advantageously, however, by staggering complimentary FPC thermal mitigation curves over a pair or more of cores in processor 710, as opposed to simply clocking the pair or more of cores at a rate consistent with clocked curve 205, power consumption savings in an amount equal to $(PL \times (t_2 - t_1)) + PL \times (t_1 - t_0))$ may be realized over a given processing cycle in some embodiments.

Figure 3:
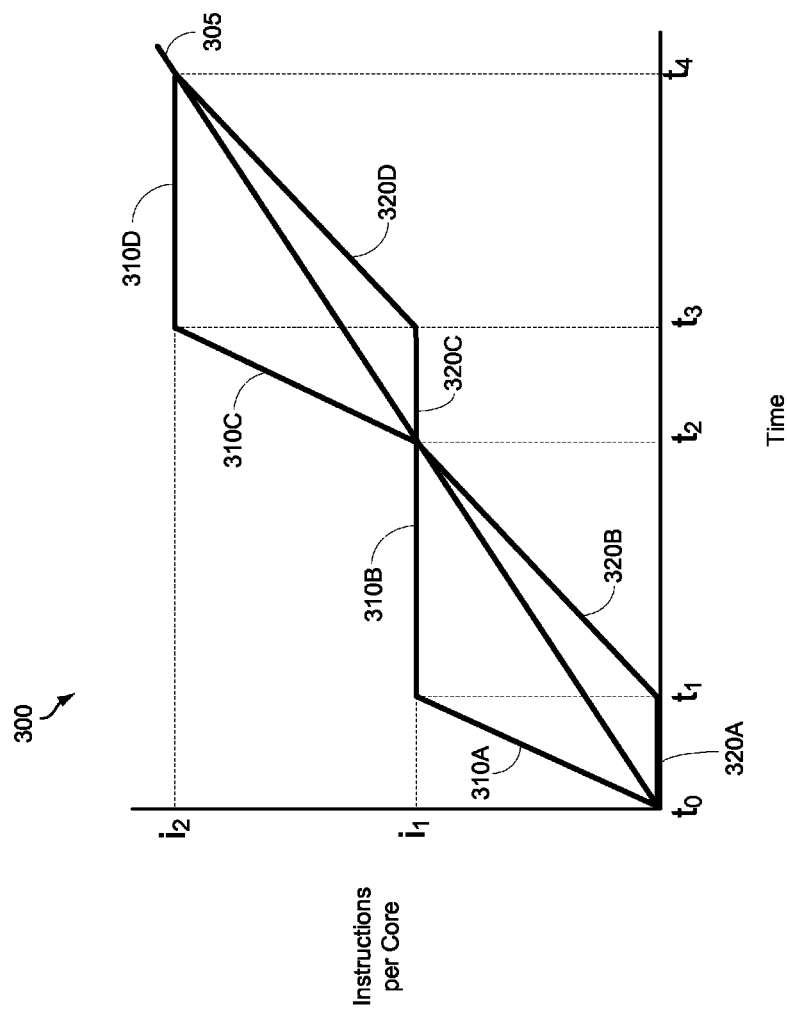
FIG. 3 is a graph of a pair of exemplary FPC curves, each representing a power cycle that may enable a processor core in a multi-core PCD processor to process an average number of millions of instructions per second ("MIPS") that is equivalent to the number of MIPS that may be processed under a particular performance level.

FIG. 3 is a graph 300 of a pair of exemplary FPC curves 310, 320, each representing a power cycle that may enable a processor core in a multi-core PCD processor 710 to process an average number of MIPS that is equivalent to the number of MIPS that may be processed under a particular clocked power curve 305. Notably, one of ordinary skill in the art will recognize that curve 305 may also represent the average number of MIPS processed by each of the exemplary FPC power curves 310, 320. Returning to the illustrative application offered for explanation of the FIG. 2 graph 200, FPC curve 310 may be implemented on processing core 822 while FPC curve 320 is implemented on processing core 824. In the FIG. 3 example, the processing curve portions 310A, 310C of core 822 are more steeply sloped than processing curve portions 320B, 320D of core 824. As such, one of ordinary skill in the art will recognize that FPC curve 310 may cause core 822 to process instructions at a higher frequency than what is provided to core 824 by FPC curve 320. Notably, by leveraging the processing power of core 822 at a higher frequency, the forced power collapse 310B of core 822 may be held over a longer period of time $(t_2 - t_1)$ than the forced power collapse 320A of complimentary core 824, thus potentially yielding greater $P_L$ savings.

The result of staggering FPC thermal mitigation techniques such as the exemplary FPC curves 310, 320 may render net $P_L$ savings consistent with that envisioned relative to the FIG. 2 application. However, in such cases that cores of CPU 710 may vary in processing capability, proximity to heat sources, thread affinity assignments and the like, it is envisioned that maximum processing power and/or minimum thermal energy generation associated with CPU 710 may be realized through application of independent, if not exactly mirrored, FPC thermal mitigation curves across multiple cores.

Figure 4:
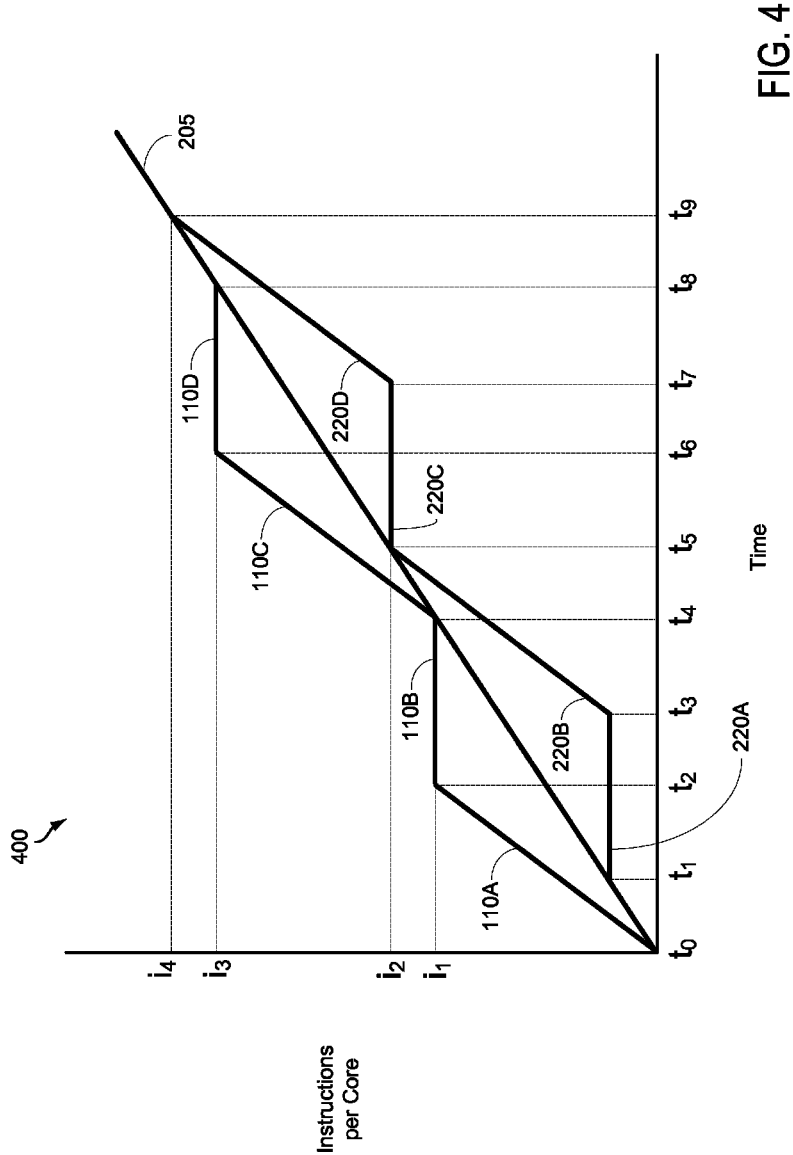
FIG. 4 is a graph of a pair of exemplary FPC curves, each representing a power cycle that may enable a processor core in a multi-core PCD processor to process an average number of MIPS that is equivalent to the number of MIPS that may be processed under a particular performance level.

FIG. 4 is a graph 400 of a pair of exemplary FPC curves 110, 220, each representing a power cycle that may enable a processor core in a multi-core PCD processor 710 to process an average number of MIPS that is equivalent to the number of MIPS that may be processed under a particular clocked power curve 205. Returning to the illustrative application offered for explanation of the FIG. 2 graph 200, FPC curve 110 may be implemented on processing core 822 while FPC curve 220 is implemented on processing core 824. In the FIG. 4 example, however, FPC curve 220 has been shifted "up" the target processing curve 205. The result of the shift is that there is a cycle overlap between the beginning of processing curve portion 110C of core 822 and the end of processing curve portion 220B of core 824 which occurs during time ($t_5$–$t_4$). Similarly, there is a cycle overlap between the beginning of the forced power collapse 110B of core 822 and the ending of the forced power collapse 220A of core 824 which occurs during time ($t_3$–$t_2$).

Cores of CPU 710 may vary in processing capability, proximity to heat sources, thread affinity assignments and the like. Notably, therefore, by staggering the FPC thermal mitigation techniques such as the exemplary FPC curves 110, 220 depicted in graph 400, it is envisioned that maximum processing power and/or minimum thermal energy generation associated with CPU 710 may be realized across multiple cores.

Figure 5:
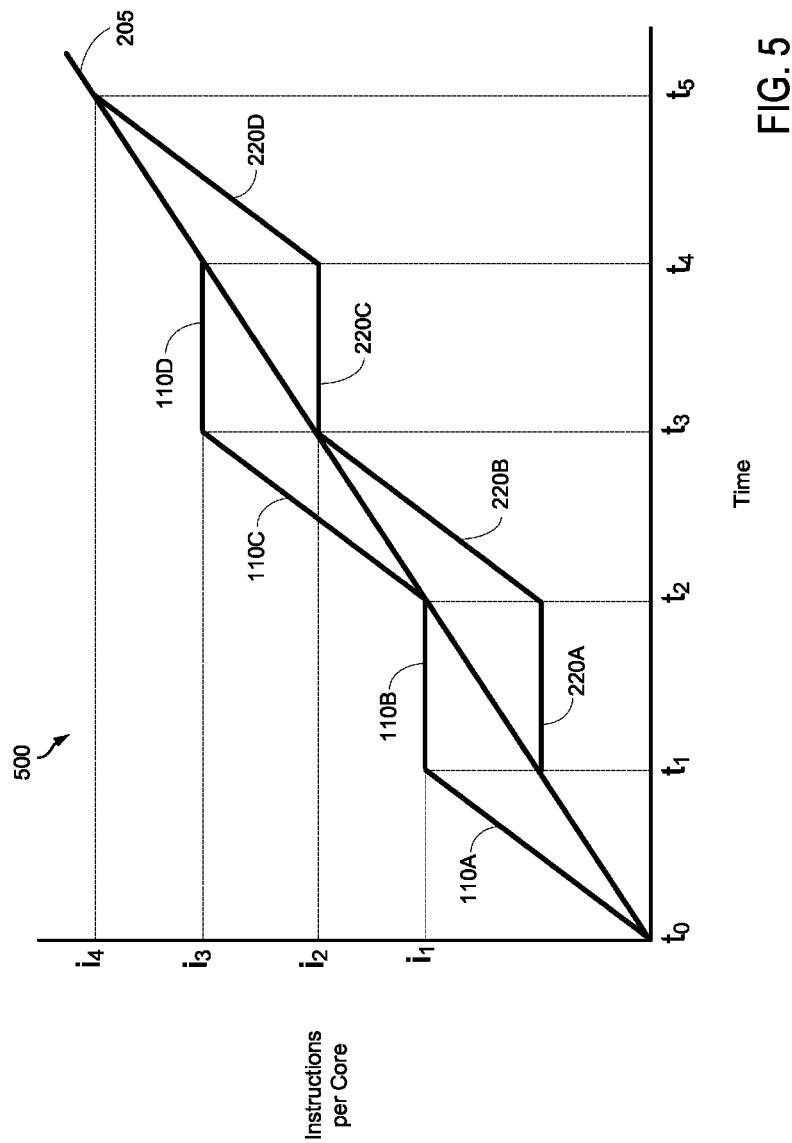
FIG. 5 is a graph of a pair of exemplary FPC curves, each representing a power cycle that may enable a processor core in a multi-core PCD processor to process an average number of MIPS that is equivalent to the number of MIPS that may be processed under a particular performance level.

FIG. 5 is a graph 500 of a pair of exemplary FPC curves 110, 220, each representing a power cycle that may enable a processor core in a multi-core PCD processor 710 to process an average number of MIPS that is equivalent to the number of MIPS that may be processed under a particular clocked power curve 205. Returning to the illustrative application offered for explanation of the FIG. 2 graph 200, FPC curve 110 may be implemented on processing core 822 while FPC curve 220 is implemented on processing core 824. In the FIG. 5 example, however, FPC curve 220 has been shifted "up" the target processing curve 205. The result of the shift is that there is a cycle overlap between the forced power collapse portions 110B, 220A of cores 822, 824 which occurs during time ($t_2$–$t_1$) and, similarly, between the forced power collapse portions 110D, 220C of cores 822, 824 which occurs during time ($t_4$–$t_3$).

Moreover, the processing curve portions of FPC curves 110, 220 in the FIG. 5 graph 500 are overlapped during time ($t_3$–$t_2$). Advantageously, by overlapping the forced power collapses of cores 822, 824, it is envisioned that thermal heat dissipation may be maximized due not only to redundant $P_L$ savings between the cores during the forced power collapses of the cores 822, 824 but also due to thermal energy absorption aspects that may be gained by the aggregate mass of the collapsed cores being present in a PCD 700 having other heat generating components.

Cores of CPU 710 may vary in processing capability, proximity to heat sources, thread affinity assignments and the like. Notably, therefore, by staggering the FPC thermal mitigation techniques such as the exemplary FPC curves 110, 220 depicted in graph 500, it is envisioned that maximum processing power and/or minimum thermal energy generation associated with CPU 710 may be realized across multiple cores.

Figure 6:
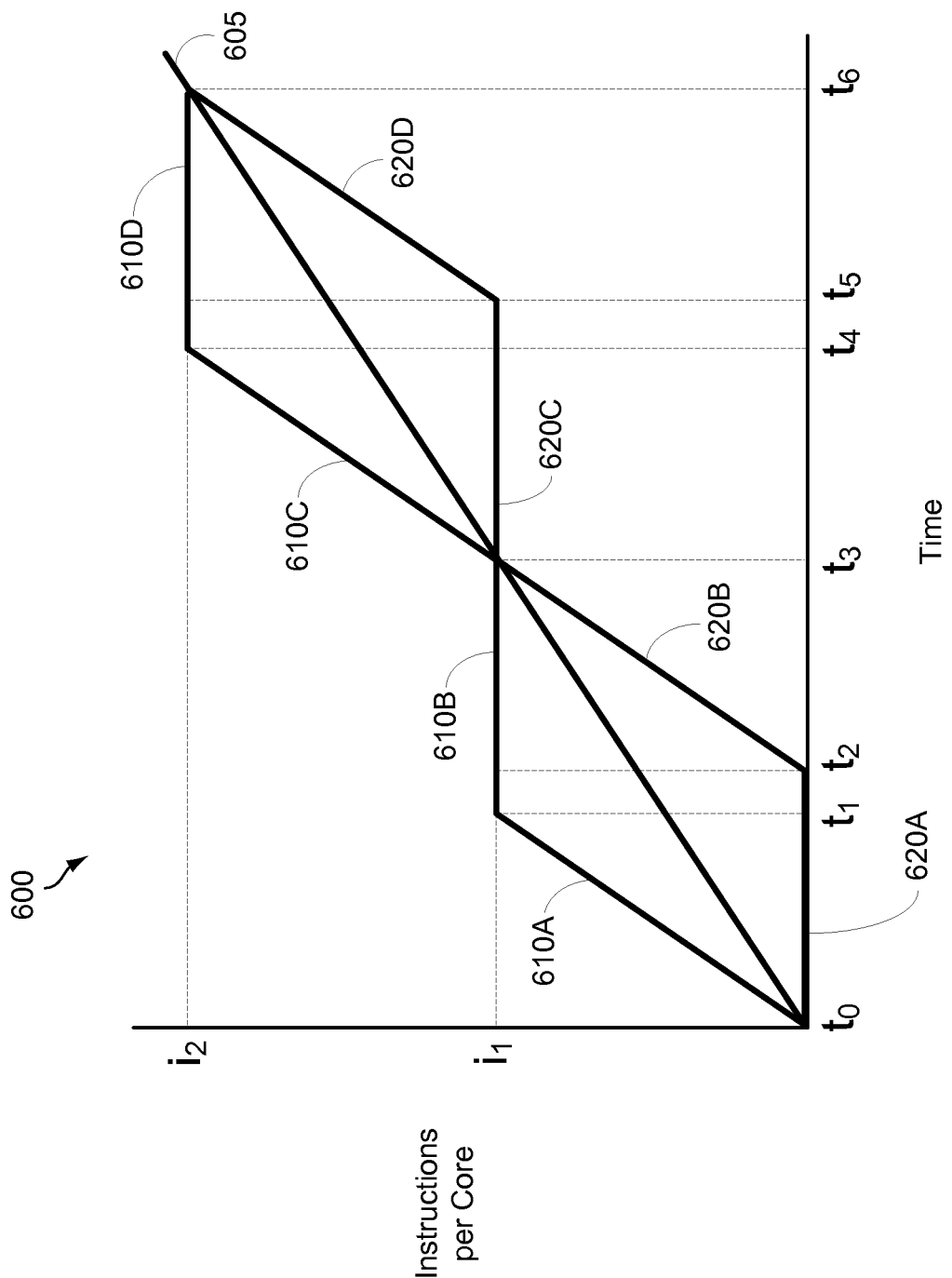
FIG. 6 is a graph of a pair of exemplary FPC curves, each representing a power cycle that may enable a processor core in a multi-core PCD processor to process an average number of MIPS that is equivalent to the number of MIPS that may be processed under a particular performance level.

FIG. 6 is a graph 600 of a pair of exemplary FPC curves 610, 620, each representing a power cycle that may enable a processor core in a multi-core PCD processor 710 to process an average number of MIPS that is equivalent to the number of MIPS that may be processed under a particular clocked power curve 605. Notably, one of ordinary skill in the art will recognize that curve 605 may also represent the average number of MIPS processed by each of the exemplary FPC power curves 610, 620. Returning to the illustrative application offered for explanation of the FIG. 2 graph 200, FPC curve 610 may be implemented on processing core 822 while FPC curve 620 is implemented on processing core 824.

In the FIG. 6 example, the processing efficiency of the cores 822, 824 during the processing curve portions 610A, 610C, 620B, 620D is high enough that each of the processors may process $I_1$ instructions in a time short enough that the forced power collapse portions 610B, 620A and 610D, 620C of each core 822, 824 may overlap during periods ($t_2$–$t_1$) and ($t_5$–$t_4$), respectively.

Cores of CPU 710 may vary in processing capability, proximity to heat sources, thread affinity assignments and the like. Notably, therefore, by staggering the FPC thermal mitigation techniques such as the exemplary FPC curves 610, 620 depicted in graph 600, it is envisioned that maximum processing power and/or minimum thermal energy generation associated with CPU 710 may be realized across multiple cores.

With regards to the exemplary FPC curves depicted in FIGS. 1-6, one of ordinary skill in the art will recognize that such curves do not represent, nor are they intended to represent, a comprehensive depiction of FPC power curves, or combinations of curves, that may be implemented as part of a thermal mitigation policy that includes forced power collapse aspects. As such, other combinations of FPC curves with various slopes, processing durations, power collapse durations, start times, end times, etc. will occur to those with ordinary skill in the art and, therefore, the particular curves depicted in FIGS. 1-6 will not limit the scope of the disclosure.

Figure 7:
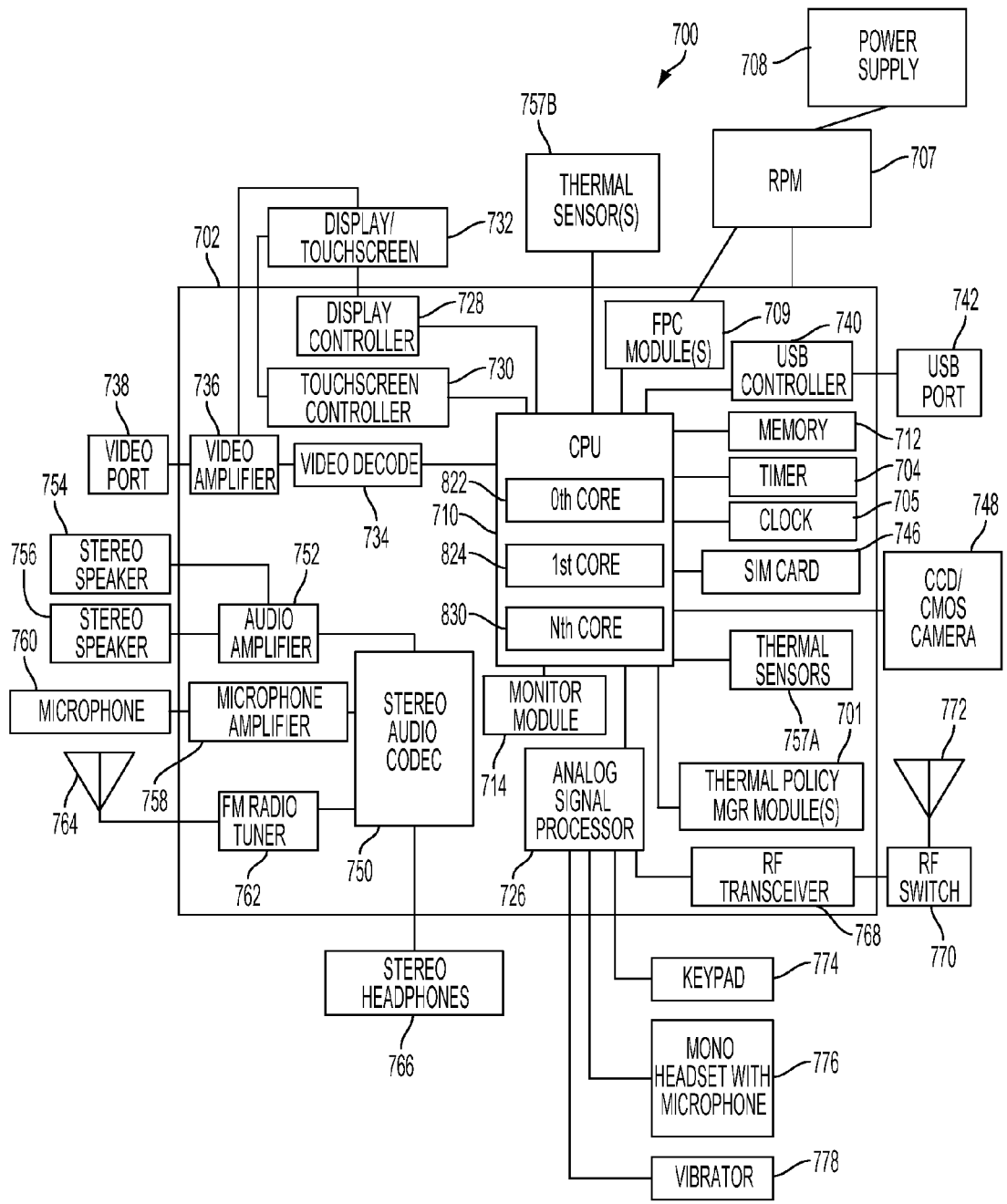
FIG. 7 is a functional block diagram illustrating an embodiment of a portable computing device ("PCD")

FIG. 7 is a functional block diagram of an exemplary, non-limiting aspect of a PCD 700 in the form of a wireless telephone for implementing methods and systems for monitoring thermal conditions and managing thermal policies. Per some embodiments, PCD 700 may be configured to manage thermal load associated with instructions processing. As shown, the PCD 700 includes an on-chip system 702 that includes a multi-core central processing unit ("CPU") 710 and an analog signal processor 726 that are coupled together. The CPU 710 may comprise a zeroth core 822, a first core 824, and an Nth core 830 as understood by one of ordinary skill in the art. Further, instead of a CPU 710, a digital signal processor ("DSP") may also be employed as understood by one of ordinary skill in the art.

In general, the thermal policy manager module(s) 701 may be responsible for monitoring and applying thermal policies that include one or more thermal mitigation techniques that may help a PCD 700 manage thermal conditions and/or thermal loads and avoid experiencing adverse thermal conditions, such as, for example, reaching critical temperatures, while maintaining a high level of functionality.

FIG. 7 also shows that the PCD 700 may include a monitor module 714. The monitor module 714 communicates with multiple operational sensors (e.g., thermal sensors 757) distributed throughout the on-chip system 702 and with the CPU 710 of the PCD 700 as well as with the thermal policy manager module 701. The thermal policy manager module 701 may work with the monitor module 714 and the forced power collapse ("FPC") module(s) 709 to identify adverse thermal conditions and apply thermal policies that include one or more thermal mitigation techniques as will be described in further detail below.

As illustrated in FIG. 7, a display controller 728 and a touch screen controller 730 are coupled to the digital signal processor 710. A touch screen display 732 external to the on-chip system 702 is coupled to the display controller 728 and the touch screen controller 730.

PCD 700 may further include a video encoder 734, e.g., a phase-alternating line ("PAL") encoder, a sequential couleur avec memoire ("SECAM") encoder, a national television system(s) committee ("NTSC") encoder or any other type of video encoder 734. The video encoder 734 is coupled to the multi-core central processing unit ("CPU") 710. A video amplifier 736 is coupled to the video encoder 734 and the touch screen display 732. A video port 738 is coupled to the video amplifier 736. As depicted in FIG. 7, a universal serial bus ("USB") controller 740 is coupled to the CPU 710. Also, a USB port 742 is coupled to the USB controller 740. A memory 712 and a subscriber identity module (SIM) card 746 may also be coupled to the CPU 710. Further, as shown in FIG. 7, a digital camera 748 may be coupled to the CPU 710. In an exemplary aspect, the digital camera 748 is a charge-coupled device ("CCD") camera or a complementary metal-oxide semiconductor ("CMOS") camera.

As further illustrated in FIG. 7, a stereo audio CODEC 750 may be coupled to the analog signal processor 726. Moreover, an audio amplifier 752 may be coupled to the stereo audio CODEC 750. In an exemplary aspect, a first stereo speaker 754 and a second stereo speaker 756 are coupled to the audio amplifier 752. FIG. 7 shows that a microphone amplifier 758 may be also coupled to the stereo audio CODEC 750. Additionally, a microphone 760 may be coupled to the microphone amplifier 758. In a particular aspect, a frequency modulation ("FM") radio tuner 762 may be coupled to the stereo audio CODEC 750. Also, an FM antenna 764 is coupled to the FM radio tuner 762. Further, stereo headphones 766 may be coupled to the stereo audio CODEC 750.

FIG. 7 further indicates that a radio frequency ("RF") transceiver 768 may be coupled to the analog signal processor 726. An RF switch 770 may be coupled to the RF transceiver 768 and an RF antenna 772. As shown in FIG. 7, a keypad 774 may be coupled to the analog signal processor 726. Also, a mono headset with a microphone 776 may be coupled to the analog signal processor 726. Further, a vibrator device 778 may be coupled to the analog signal processor 726. FIG. 7 also shows that a power supply 708, for example a battery, is coupled to the on-chip system 702. In a particular aspect, the power supply includes a rechargeable DC battery or a DC power supply that is derived from an alternating current ("AC") to DC transformer that is connected to an AC power source.

The CPU 710 may also be coupled to one or more internal, on-chip thermal sensors 757A as well as one or more external, off-chip thermal sensors 757B. The on-chip thermal sensors 757A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 757B may comprise one or more thermistors. The thermal sensors 757 may produce a voltage drop that is converted to digital signals with an analog-to-digital converter ("ADC") controller 703 (See FIG. 8). However, other types of thermal sensors 757 may be employed without departing from the scope of the invention.

The thermal sensors 757, in addition to being controlled and monitored by an ADC controller 703, may also be controlled and monitored by one or more thermal policy manager module(s) 701. The thermal policy manager module(s) 701 may comprise software which is executed by the CPU 710. However, the thermal policy manager module(s) 701 may also be formed from hardware and/or firmware without departing from the scope of the invention. The thermal policy manager module(s) 701 may be responsible for monitoring and applying thermal policies that include one or more thermal mitigation techniques that may help a PCD 700 avoid critical temperatures while maintaining a high level of functionality. Similarly, the FPC module(s) 709 may comprise software which is executed by the CPU 710. However, the FPC module(s) 709 may also be formed from hardware and/or firmware without departing from the scope of the invention. The FPC module(s) 709, working in concert with resource power management ("RPM") module(s) 707, timer(s) 704 and clock(s) 705 may be responsible for applying thermal policies that include one or more thermal mitigation techniques that may help a PCD 700 avoid critical temperatures while maintaining a high level of functionality.

FIG. 7 also shows that the PCD 700 may include a monitor module 714. The monitor module 714 communicates with multiple operational sensors distributed throughout the on-chip system 702 and with the CPU 710 of the PCD 700 as well as with the thermal policy manager module 701. The thermal policy manager module 701 may work with the monitor module to apply thermal policies that include one or more thermal mitigation techniques as will be described in further detail below.

FIG. 7 further shows that the touch screen display 732, the video port 738, the USB port 742, the camera 748, the first stereo speaker 754, the second stereo speaker 756, the microphone 760, the FM antenna 764, the stereo headphones 766, the RF switch 770, the RF antenna 772, the keypad 774, the mono headset 776, the vibrator 778, thermal sensors 757B, and the power supply 780 are external to the on-chip system 702. However, it should be understood that the monitor module 714 may also receive one or more indications or signals from one or more of these external devices by way of the analog signal processor 726 and the CPU 710 to aid in the real time management of the resources operable on the PCD 700.

In a particular aspect, one or more of the method steps described herein may be implemented by executable instructions and parameters stored in the memory 712 that form the one or more thermal policy manager module(s) 701 and/or forced power collapse module(s) 709. These instructions that form the module(s) may be executed by the CPU 710, the analog signal processor 726, or another processor, in addition to the ADC controller 703 to perform the methods described herein. Further, the processors 710, 726, the memory 712, the instructions stored therein, or a combination thereof may serve as a means for performing one or more of the method steps described herein.

Figure 8:
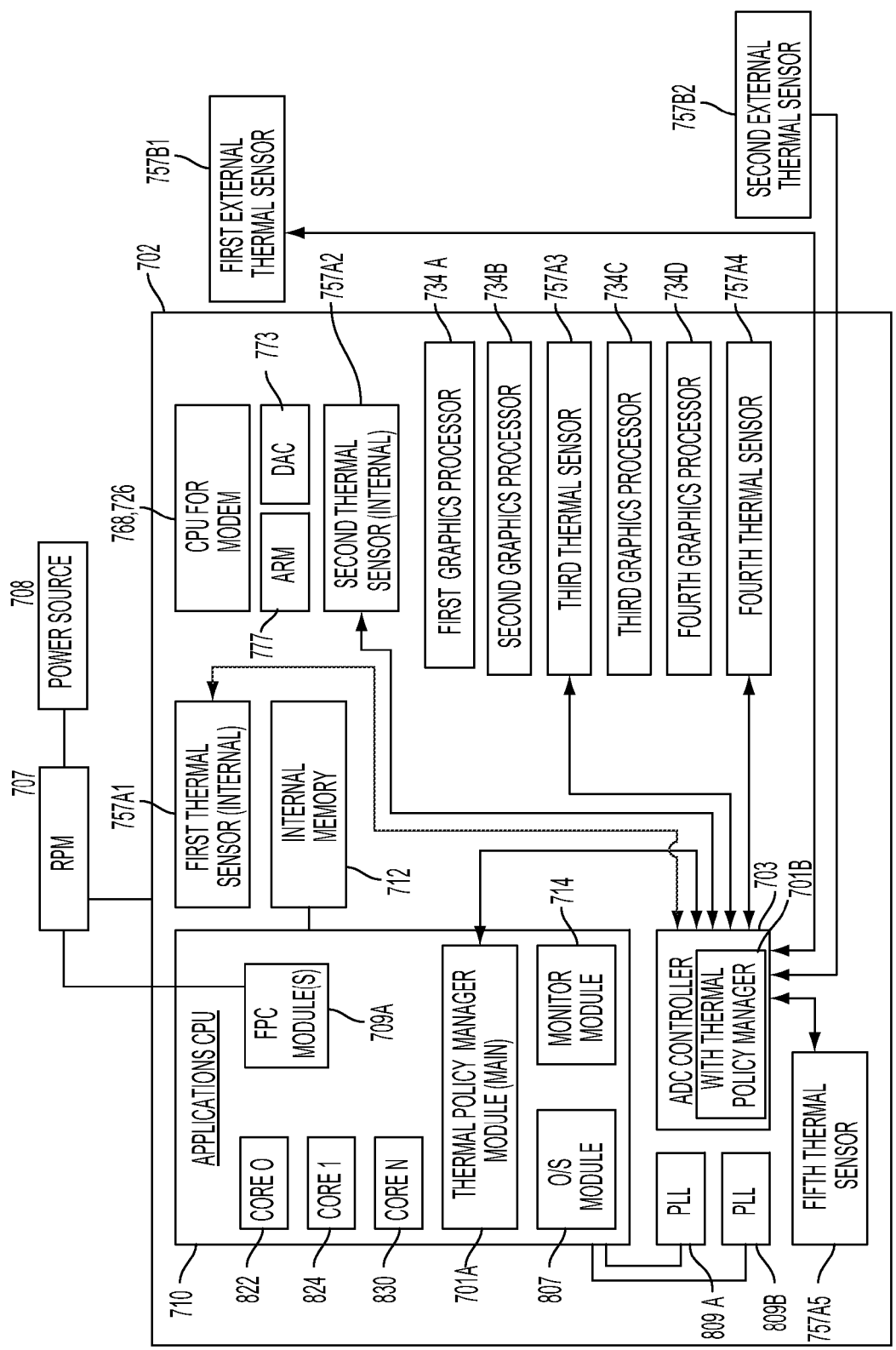
FIG. 8 is a functional block diagram illustrating an exemplary spatial arrangement of hardware for a chip illustrated in FIG. 7.

FIG. 8 is a functional block diagram illustrating an exemplary spatial arrangement of hardware for the chip 702 illustrated in FIG. 7. According to this exemplary embodiment, the applications CPU 710 is positioned on the far left side region of the chip 702 while the modem CPU 768, 726 is positioned on a far right side region of the chip 702. The applications CPU 710 may comprise a multi-core processor that includes a zeroth core 822, a first core 824, and an Nth core 830. The applications CPU 710 may be executing a thermal policy manager module 701A and/or a forced power collapse module 709A (when embodied in software) or it may include a thermal policy manager module 701A and/or a forced power collapse module 709A (when embodied in hardware). The application CPU 710 is further illustrated to include operating system ("O/S") module 807 and a monitor module 714.

The applications CPU 710 may be coupled to one or more phase locked loops ("PLLs") 809A, 809B, which are positioned adjacent to the applications CPU 710 and in the left side region of the chip 702. Adjacent to the PLLs 809A, 809B and below the applications CPU 710 may comprise an analog-to-digital ("ADC") controller 703 that may include its own thermal policy manager 701B that works in conjunction with the main thermal policy manager module 701A of the applications CPU 710.

The thermal policy manager 701B of the ADC controller 703 may be responsible for monitoring and tracking multiple thermal sensors 757 that may be provided "on-chip" 702 and "off-chip" 702. The on-chip or internal thermal sensors 757A may be positioned at various locations.

For example, a first internal thermal sensor 757A1 may be positioned in a top center region of the chip 702 between the applications CPU 710 and the modem CPU 768,726 and adjacent to internal memory 712. A second internal thermal sensor 757A2 may be positioned below the modem CPU 768, 726 on a right side region of the chip 702. This second internal thermal sensor 757A2 may also be positioned between an advanced reduced instruction set computer ("RISC") instruction set machine ("ARM") 777 and a first graphics processor 735A. A digital-to-analog controller ("DAC") 773 may be positioned between the second internal thermal sensor 757A2 and the modem CPU 768, 726.

A third internal thermal sensor 757A3 may be positioned between a second graphics processor 735B and a third graphics processor 735C in a far right region of the chip 702. A fourth internal thermal sensor 757A4 may be positioned in a far right region of the chip 702 and beneath a fourth graphics processor 735D. And a fifth internal thermal sensor 757A5 may be positioned in a far left region of the chip 702 and adjacent to the PLLs 809 and ADC controller 703.

One or more external thermal sensors 757B may also be coupled to the ADC controller 703. The first external thermal sensor 757B1 may be positioned off-chip and adjacent to a top right quadrant of the chip 702 that may include the modem CPU 768, 726, the ARM 777, and DAC 773. A second external thermal sensor 757B2 may be positioned off-chip and adjacent to a lower right quadrant of the chip 702 that may include the third and fourth graphics processors 735C, 735D.

One of ordinary skill in the art will recognize that various other spatial arrangements of the hardware illustrated in FIG. 8 may be provided without departing from the scope of the disclosure. FIG. 8 illustrates yet one exemplary spatial arrangement and how the main thermal policy manager module 701A and ADC controller 703 with its thermal policy manager 701 B may manage thermal conditions that are a function of the exemplary spatial arrangement illustrated in FIG. 8.

Figure 9:
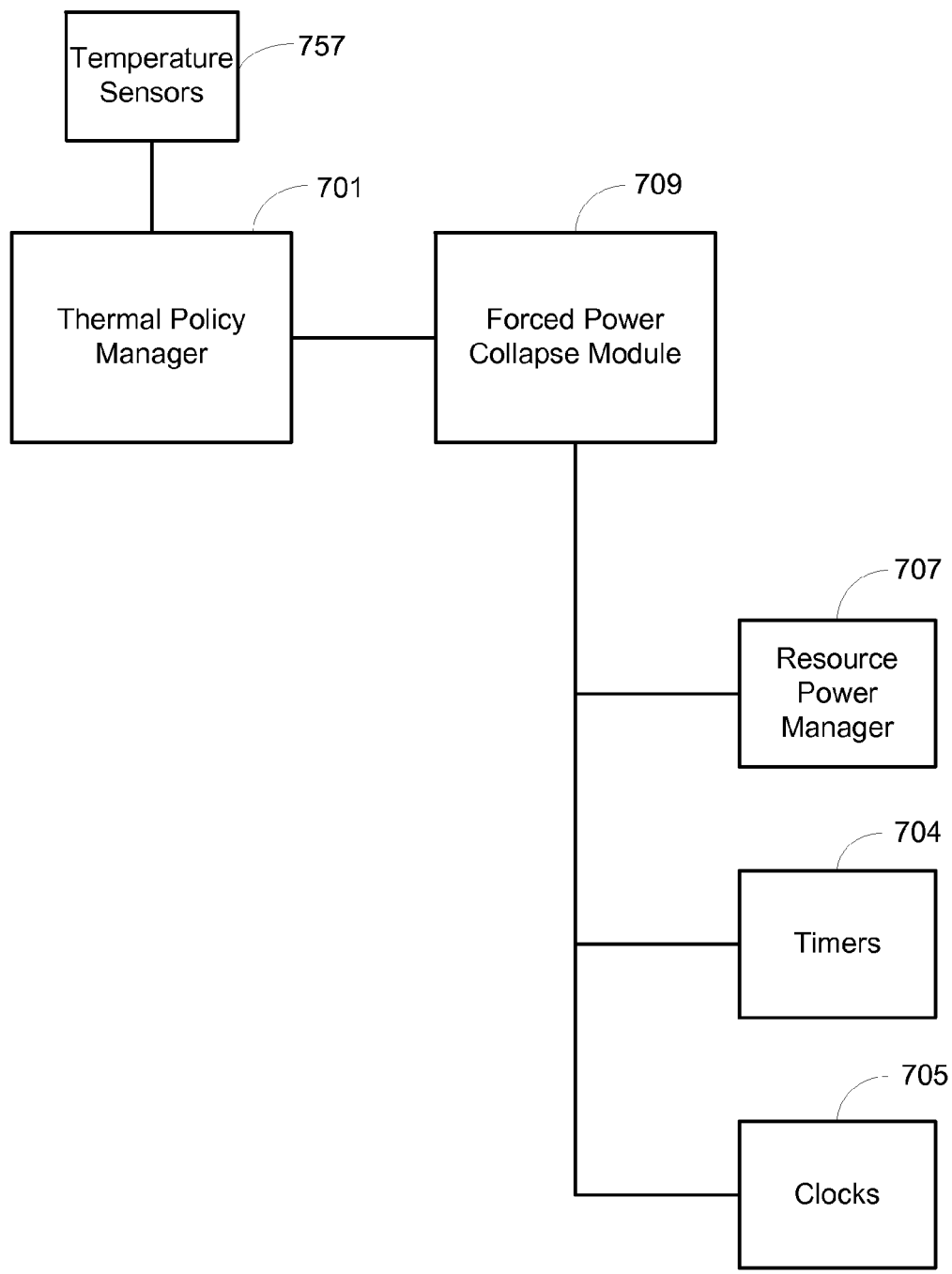
FIG. 9 is a functional block diagram illustrating respective logical connections between a thermal policy manager ("TPM"), a Forced Power Collapse ("FPC") Module, a Resource Power Manager ("RPM") and hardware devices of the chip illustrated in FIG. 8.

FIG. 9 is a functional block diagram illustrating respective logical connections between a thermal policy manager ("TPM") 701, a Forced Power Collapse Module ("FPC") 709, a Resource Power Manager ("RPM") 707 and clocks 705 and timers 704 of the chip illustrated in FIG. 8. The TPM 701 may be in communication with temperature sensors 757 via an intermediary component such as monitoring module 714 (not depicted in FIG. 9), but such an arrangement is not a required aspect for all embodiments.

The TPM 701 receives inputs from temperature sensors 757 that may indicate a thermal energy condition warranting the application of a thermal mitigation technique. In one exemplary embodiment, the TPM 701 may determine that a core of CPU 710 should be "clocked" such that the frequency of CPU 710 is reduced to a level that may mitigate the present consumption rate of active power by CPU 710. The suggested reduced frequency, as determined by the TPM 701, may be forwarded to the FPC module 709 for application to the CPU 710.

Upon receipt of instructions from the TPM 701 to reduce the frequency of CPU 710, FPC module 709 may compare the power savings and/or processing efficiencies of simply reducing the frequency per the TPM 701 instructions versus application of an alternative FPC thermal mitigation algorithm. Upon determining the best thermal mitigation method to apply to CPU 710, the FPC module 709 may cause the determined method to be implemented on CPU 710 via communication and calibration of RPM 707, timers 704 and clocks 705. More detail concerning the implementation of a FPC thermal mitigation technique is discussed below in connection with FIGS. 10-13.

Figure 10:
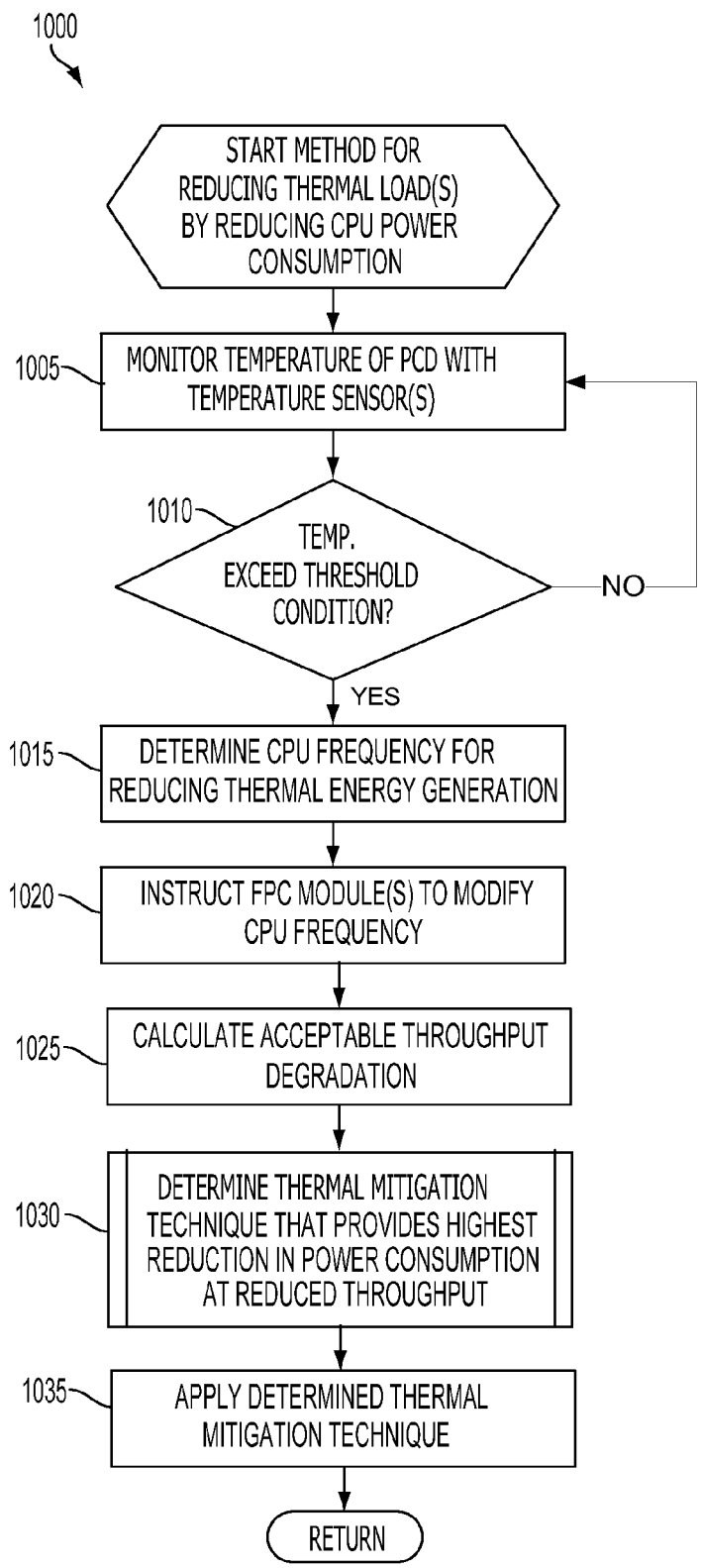
FIG. 10 is a logical flowchart illustrating a method for reducing thermal loads by reducing power consumption in a PCD.

FIG. 10 is a logical flowchart illustrating a method 1000 for reducing thermal loads by reducing power consumption in a PCD 700. At block 1005, the thermal policy manager module 701 may monitor the temperature of the PCD 700 with temperature sensors 757. Particularly, the thermal policy manager module 701 may monitor the temperature near the hardware devices on chip 702 of FIG. 8 with temperature sensors 757A1, 757A2.

Next, in decision block 1010, the thermal policy manager module 701 may track threshold temperature values to determine whether the application of a thermal mitigation technique is warranted. If the inquiry to decision block 1010 is negative, then the "NO" branch is followed back to block 1005. If the inquiry to decision block 1010 is positive, then the "YES" branch is followed to block 1015. In block 1015, the thermal policy manager module 701 may calculate a CPU 710 processing frequency that will lower thermal energy generation, at the expense of QoS, by lowering the consumption of $P_A$.

In block 1020, the thermal policy manager module 701 may forward instructions to FPC module 709 consistent with its calculation at block 1015 to reduce the processing frequency of CPU 710. Next, in block 1025, the FPC module 709 may calculate a frequency for CPU 710, or a core within CPU 710. At block 1025, a throughput degradation associated with the reduced frequency that was called for by the policy manager module 701 may be calculated. The throughput degradation may be quantified any number of ways including, but not limited to, by the number of MIPS that can be processed at a given frequency or by a frequency reduction percentage. Subsequently, in routine or sub-method block 1030, the FPC module 709 may compare the power savings and/or processing efficiency associated with the CPU 710 running at the suggested frequency versus the power savings and/or processing efficiency associated with the CPU 710 running on a power curve that includes a forced power collapse. Further details of sub-method block 1030 will be described below in connection with FIG. 11.

After routine block 1030, in block 1035, the FPC module 709 may coordinate with the RPM 707, the clocks 705 and the timers 704 to implement the most efficient thermal mitigation technique. The method 1000 then returns back to block 1005 in which the temperature of the chip 702 is monitored by the thermal policy manager module 701.

Figure 11:
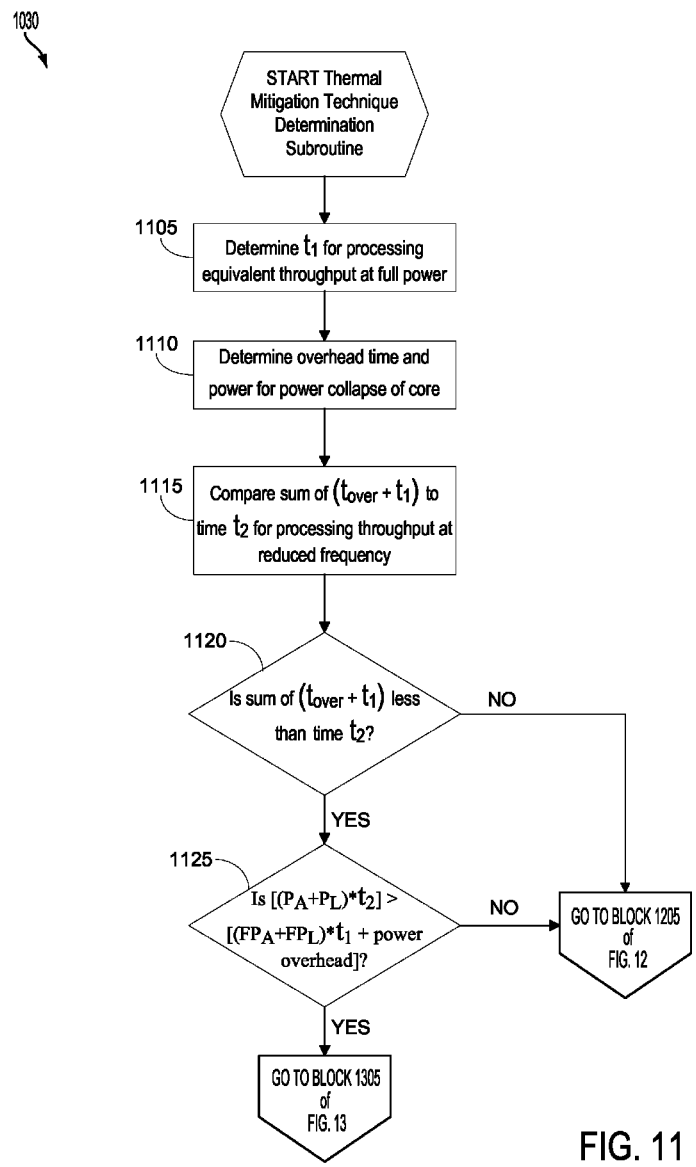
FIG. 11 is a logical flowchart illustrating a sub-method or subroutine for determining a thermal mitigation technique that may provide the most efficient reduction in power consumption in a PCD.

FIG. 11 is a logical flowchart illustrating a sub-method or subroutine 1030 for determining a thermal mitigation technique that may provide the most efficient reduction in power consumption in a PCD 700. At block 1105, the FPC module 709 may determine the amount of time $t_1$ that would be required for CPU 710 to process the number of instructions calculated at block 1025 of FIG. 10 if the CPU 710 were running at its highest frequency. Notably, although in some embodiments $t_1$ may be determined based on the time required to process a given number of MIPS, one of ordinary skill in the art will understand that $t_1$ may be determined based on other factors such as, but not limited to, a frequency ratio. As a non-limiting example, $t_1$ may be determined based on a ratio of the reduced frequency ordered by the policy manager module 701 and the maximum frequency of the core. In such an exemplary embodiment, for example, a reduced frequency of 500 MHz over a maximum frequency of 1 GHz may dictate that $t_1$ be half of $t_2$ (where 500/1000 equals 0.5 and $t_2$ is the amount of time required for the processor to process a given throughput at the reduced frequency). Subsequently, at block 1110, the FPC module 709 may determine the amount of overhead time $t_{over}$ and power that is required to power collapse CPU 710 before benefits from the avoidance of $P_L$ can be realized. Notably, the sum of $t_1$ and $t_{over}$, as calculated at block 1115, represents the amount of time that CPU 710 will require to process $I_1$ instructions before its energy consumption $[E=(FP_A \times t)+(P_L \times t)]$ can be mitigated via a forced power collapse.

At decision block 1120, if $(t_1+t_{over})$ is determined to be less than $t_2$, where $t_2$ is the amount of time that would be required for CPU 710 to process the number of instructions calculated at block 1025 of FIG. 10 if the CPU 710 were running at the reduced frequency suggested by the TPM 701, then potential power savings in an amount equal to $[(P_A+P_L)*t_2]-[(FP_A+FP_L)*t_1+\text{power overhead}]$ may be realized via application of a FPC thermal mitigation algorithm. In the alternative, if $(t_1+t_{over})$ is equal to or greater than $t_2$, the FPC module 709 may implement the reduced frequency thermal mitigation technique suggested by TPM 701.

Figure 12:
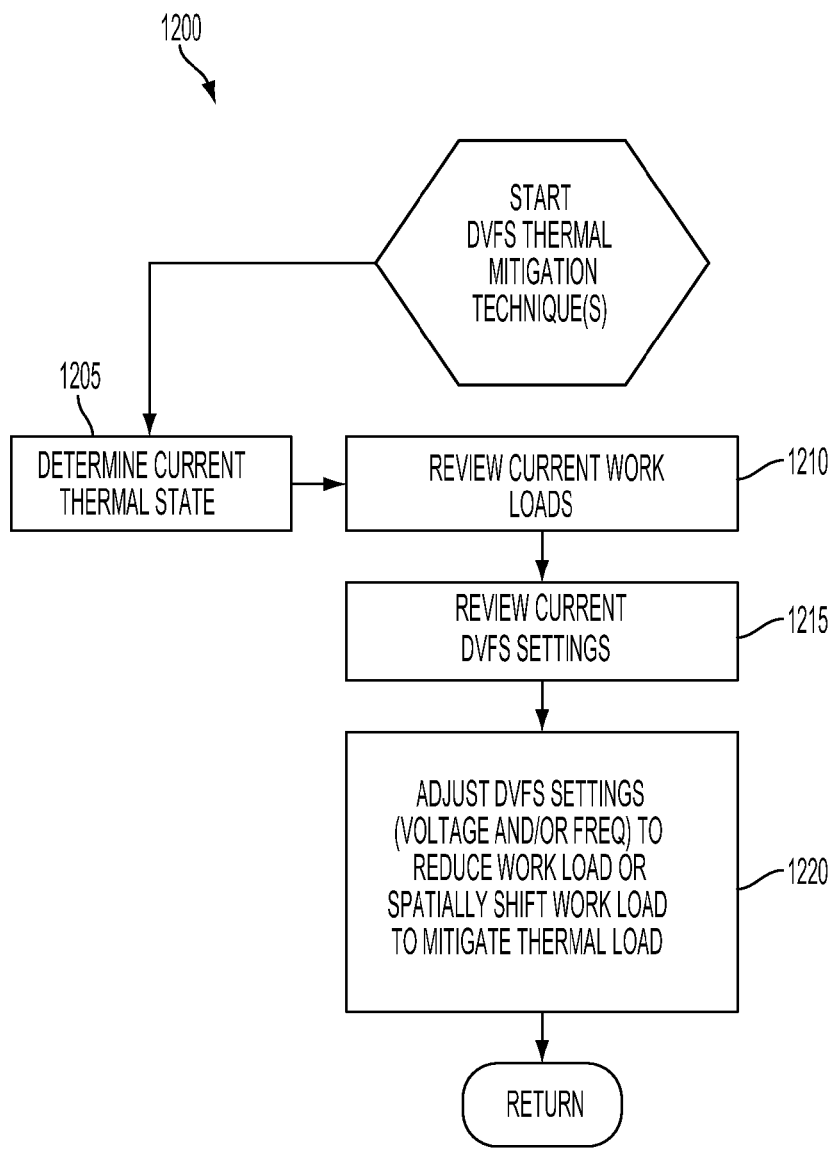
FIG. 12 is a logical flowchart illustrating a method for applying a dynamic voltage and frequency scaling ("DVFS") thermal mitigation technique in a PCD.

If the indication at decision block 1120 is that $(t_1+t_{over})$ is equal to or greater than $t_2$, then the subroutine 1030 may proceed to block 1205 of FIG. 12. Notably, in such a case, one of ordinary skill in the art will recognize that the decision to proceed to block 1205 may be predicated upon the acknowledgement that the reduced frequency suggested by the TPM 701 represents a best case QoS level. If, however, the indication at decision block 1120 is that $(t_1+t_{over})$ is less than $t_2$, thus indicating at least an equivalent QoS level to the thermal mitigation technique proposed by TPM 701, then the subroutine 1030 may continue to block 1125.

At block 1125, the predicted power consumption at the reduced frequency suggested by the TPM 701 (i.e., the alternative or benchmark thermal mitigation technique(s) to a forced power collapse technique) may be compared to the predicted power consumption of the CPU 710 operating under a forced power collapse thermal mitigation technique. If $[(P_A+P_L)*t_2]>[(FP_A+FP_L)*t_1+\text{power overhead}]$ then the subroutine 1030 may proceed to block 1305 of FIG. 13 because an FPC technique which leverages a maximum processing frequency (or some frequency less than maximum processing frequency) may consume less power to process a given workload without detriment to QoS level. If $[(P_A+P_L)*t_2]<[(FP_A+FP_L)*t_1+\text{power overhead}]$, then the subroutine 1030 may default to block 1205 of FIG. 12 and proceed to implement the reduced frequency initially suggested by the TPM 701.

Notably, the thermal mitigation technique determination algorithm 1030 has been described in terms of a two-step comparison that includes both time and power consumption comparisons between an FPC thermal mitigation technique and a frequency reduction thermal mitigation technique. Essentially, if the time for processing a given workload under an FPC thermal mitigation technique is less than the time for processing the same workload under a frequency reduction technique, then the difference in time represents an opportunity for power savings under the FPC technique. If the opportunity to save power during the time delta is recognized, the power consumption of the alternative thermal mitigation techniques are compared before a technique is ultimately selected and implemented. This is just one embodiment of an exemplary technique determination algorithm 1030 and, as such, one of ordinary skill in the art will recognize that the thermal mitigation technique determination algorithm 1030 may alternatively be based on any single factor or combination of factors including, but not limited to, processing time, power consumption, QoS level, thermal energy generation, empirical data associated with past implementations, predicted workloads, etc.

Figure 13:
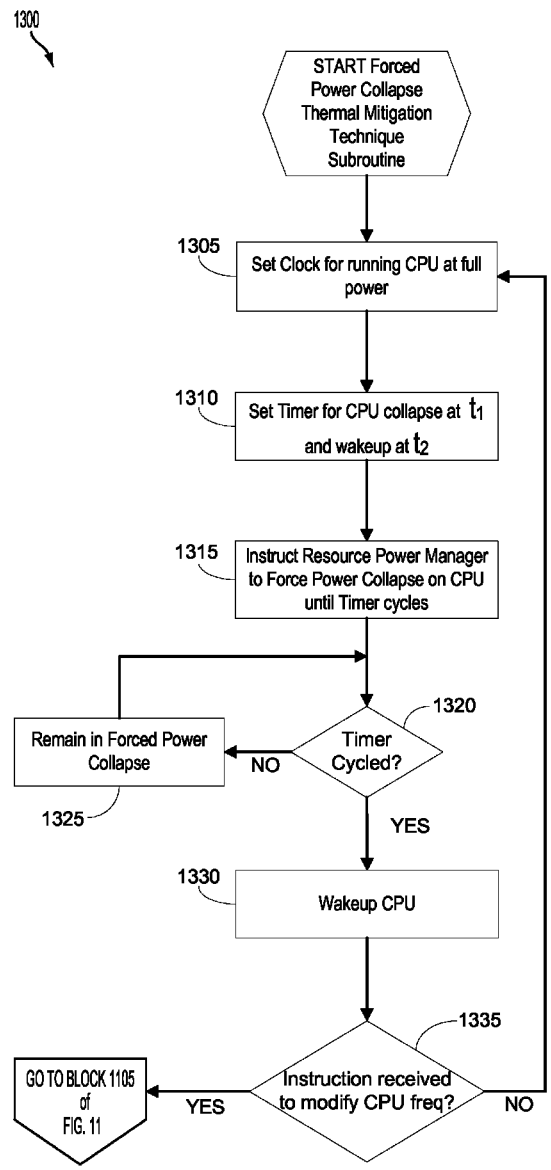
FIG. 13 is a logical flowchart illustrating a method for reducing thermal loads by applying a Forced Power Collapse ("FPC") thermal mitigation technique in a PCD.

An exemplary FPC thermal mitigation algorithm consistent with the exemplary power curves described relative to FIGS. 1-6 is described in more detail in FIG. 13. An exemplary reduced frequency thermal mitigation technique is described below in more detail in connection with FIG. 12.

FIG. 12 is a logical flowchart illustrating a method 1200 for applying dynamic voltage and frequency scaling ("DVFS") thermal mitigation techniques. DVFS algorithms may form, or be part of, at least one thermal mitigation technique that may be triggered by the thermal policy manager module 701 when certain thermal conditions are met as described above. A DVFS thermal mitigation technique enables trade-offs between power consumption and performance.

Processors 710 and 726 (FIGS. 7-8) may be designed to take advantage of DVFS by allowing the clock frequency of each processor to be adjusted with a corresponding adjustment in voltage. A reduction in operating voltage usually results in a proportional savings in active power $P_A$ consumed but, as described above, has no effect on consumption of leakage power $P_L$.

Block 1205 is the first step in a thermal mitigation technique that includes a DVFS solution. In this first block 1205, the thermal policy manager module 701 may determine the current thermal state based on temperature readings provided by thermal sensors 757. Once the current thermal state is determined by the thermal policy manager module 701, the thermal policy manager module 701 may review at block 1210 the current workloads of one or more hardware and/or software modules before forwarding a suggested DVFS setting to FPC module 709 (block 1020 of FIG. 10). FPC module 709, after proceeding through thermal mitigation technique determination subroutine 1030, may then review the current DVFS settings of CPU 710 in block 1215.

Next, in block 1220, the FPC module 709 may adjust or issue commands to adjust the current DVFS settings at clocks 705 that may include voltage and/or frequency, in order to reduce workload or to spatially shift the workload to mitigate thermal loading conditions.

According to exemplary DVFS thermal mitigation solutions that may be suggested by TPM 701, FPC module 709 may elect to initiate thermal mitigation techniques such as, but not limited to, (1) load scaling and/or (2) load dynamic scaling. Load scaling may comprise adjusting or "scaling" the maximum frequency of clock 705 that is allowed in a DVFS algorithm.

FIG. 13 is a logical flowchart illustrating a method 1300 for reducing thermal loads by applying a Forced Power Collapse ("FPC") thermal mitigation technique in a PCD 700. The method 1300 will be described relative to the FPC curve depicted and described relative to FIG. 1.

In the event that FPC 709 determines per subroutine 1030 that an FPC thermal mitigation technique should be employed, at block 1305 FPC module 709 may set clock 705 for running CPU 710, or a core within CPU 710, at a full power rating beginning at time $t_0$. CPU 710 may run at the full power rating until a time $t_1$. At block 1310, timer 704 may be set to cause RPM 707 to remove all power to CPU 710 at time $t_1$ (see FIG. 1 graph 100) per block 1315, thereby forcing a power collapse on CPU 710. Timer 704 may also be set to cause RPM 707 to "wake-up" CPU 710 at time $t_2$. Advantageously, by forcing a power collapse on CPU 710 for a time period between time $t_1$ and time $t_2$, $P_L$ savings in an amount equal to $P_L \times (t_2 - (t_1 + t_{over}))$ may be realized.

At decision block 1320, if the timer has not cycled, the CPU 710 will remain in a forced power collapse state per block 1325 thereby saving consumption of $P_L$ as described above. Once timer 704 cycles to time $t_2$, the CPU 710 is awakened at block 1330 and, if no further instruction from TPM 701 has been received by FPC module 709 at decision block 1335, the cycle returns to block 1305 and repeats between times $t_2$ and $t_4$. If, at decision block 1335, FPC module 709 has received instructions from TPM 701 to further modify the processing frequency of CPU 710 (block 1020 of method 1000), FPC module 709 may return to block 1105 of subroutine 1030.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium.

In the context of this document, a computer-readable medium is an electronic, magnetic, optical, or other physical device or means that may contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" may include any means that may store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

Computer-readable media include both computer storage media and communication media including any medium that facilitates transfer of a computer program from one place to another. A storage media may be any available media that may be accessed by a computer. By way of example, and not limitation, such computer-readable media may comprise any optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for reducing thermal energy generation in a portable computing device ("PCD"), the method comprising:
    detecting an increase in thermal energy generation on at least a first processing component of the PCD;
    applying a thermal mitigation technique to reduce thermal energy resulting from leakage power ("PL") in response to detecting the increase in thermal energy generation on at least the first processing component of the PCD, the thermal mitigation technique comprising:
        calculating a processing capability of the first processing component of the PCD over a first period of time; and
        based on the calculated processing capability, setting a timer component of the PCD to trigger a forced power collapse that removes all power to the first processing component for a second period of time that is less than the first period of time.

2. The method of claim 1,
    wherein the first period of time extends from a time $t_0$ to a time $t_2$, wherein the second period of time extends from one of: a) a time $t_0$ to a time $t_1$ where $t_0 < t_1 < t_2$ or b) a time $t_1$ to a time $t_2$ where $t_0 < t_1 < t_2$, and wherein the processing capability is calculated at a first frequency that is provided to the first processing component, the first frequency associated with a full power rating of the first processing component.

3. The method of claim 2, further comprising:

modifying the first frequency provided to the first processing component to a second frequency for a third period of time that is less than the first period of time and different than the second period of time, wherein the second frequency provided to the first processing component for the third period of time enables the first processing component to have a substantially equivalent processing capability over the third period of time as the calculated processing capability associated with the first frequency over the first period of time.

4. The method of claim 3, wherein providing the first frequency is associated with a temperature reading of the PCD.

5. The method of claim 2, further comprising:

modifying the first frequency provided to the first processing component to a second frequency for a third period of time that is less than the first period of time and different than the second period of time, wherein the second frequency provided to the first processing component for the third period of time enables the first processing component to have a higher processing capability over the third period of time than the calculated processing capability associated with the first frequency over the first period of time.

6. The method of claim 1, further comprising:

calculating the processing capability of a second processing component at a first frequency over the first period of time; and modifying the first frequency provided to the second processing component, wherein the modified first frequency enables the second processing component to have a substantially equivalent processing capability over a second period of time as the calculated processing capability associated with the first frequency over the first period of time, wherein the second period of time is less than the first period of time.

7. The method of claim 1, further comprising:

calculating a processing capability of a second processing component of the PCD over the first period of time; and based on the calculated processing capability, setting another timer component of the PCD to trigger a forced power collapse that removes all power to the second processing component for a third period of time that is different than the second period of time.

8. The method of claim 7, wherein the first period of time extends from a time $t_0$ to a time $t_2$, and wherein the third period of time extends from one of: a) a time $t_0$ to a time $t_1$ where $t_0 < t_1 < t_2$ or b) a time $t_1$ to a time $t_2$ where $t_0 < t_1 < t_2$.

9. The method of claim 7, wherein the first period of time extends from a time $t_0$ to a time $t_2$, and wherein the third period of time extends from one of: a) a time $t_0$ to a time $t_1$ where $t_0 < t_1 < t_2$ or b) a time $t_1$ to a time $t_3$ where $t_0 < t_1 < t_2$ and $t_3 > t_2$.

10. The method of claim 1, wherein calculating the processing capability of the first processing component of the PCD over the first period of time comprises determining a first number of instructions that the first processing component is capable of processing over the first period of time at a first frequency, and further comprising:

providing a second frequency to the first processing component, wherein the second frequency is selected to enable the first processing component to process the first number of instructions within a third period of time that is less than the first period of time.

11. A computer system for reducing thermal energy generation in a portable computing device ("PCD"), the system comprising:

a detector operable to:

detect an increase in thermal energy generation on at least a first processing component of the PCD;

a thermal policy manager ("TPM") module operable to:

calculate a processing capability of the first processing component of the PCD over a first period of time; and a forced power collapse ("FPC") module for applying a thermal mitigation technique to reduce thermal energy resulting from leakage power ("PL") in response to detecting the increase in thermal energy generation on at least the first processing component of the PCD, the thermal mitigation technique comprising, the FPC module operable to:

based on the calculated processing capability, set a timer component of the PCD to trigger a forced power collapse that removes all power to the first processing component for a second period of time that is less than the first period of time.

12. The computer system of claim 11, wherein the first period of time extends from a time $t_0$ to a time $t_2$, wherein the second period of time extends from one of: a) a time $t_0$ to a time $t_1$ where $t_0 < t_1 < t_2$ or b) a time $t_1$ to a time $t_2$ where $t_0 < t_1 < t_2$, and wherein the processing capability is calculated at a first frequency that is provided to the first processing component, the first frequency associated with a full power rating of the first processing component.

13. The computer system of claim 12, wherein the TPM module is further operable to:

modify the first frequency provided to the first processing component to a second frequency for a third period of time that is less than the first period of time and different than the second period of time, wherein the second frequency provided to the first processing component for the third period of time enables the first processing component to process the calculated number of instructions over the third period of time.

14. The computer system of claim 13, wherein providing the first frequency is associated with a temperature reading of the PCD.

15. The computer system of claim 12, further operable to:

modify the first frequency provided to the first processing component to a second frequency for a third period of time that is less than the first period of time and different than the second period of time, wherein the second frequency provided to the first processing component for the third period of time enables the first processing component to have a higher processing capability over the third period of time than the calculated processing capability associated with the first frequency over the first period of time.

16. The computer system of claim 11, wherein calculating the processing capability of the first processing component comprises calculating the number of instructions that the first processing component is capable of processing at a first frequency over the first period of time; and wherein the TPM module is further operable to:

provide a second frequency to the first processing component, wherein the second frequency enables the first processing component to process the calculated number of instructions over a third period of time that is less than the first period of time and different than the second period of time.

17. The computer system of claim 11, wherein the TPM module is further operable to:
calculate a processing capability of a second processing component of the PCD over the first period of time; and
based on the calculated processing capability, set another timer component of the PCD to trigger a forced power collapse that removes all power to the second processing component for a third period of time that is different than the second period of time.

18. The computer system of claim 17, wherein the first period of time extends from a time $t_0$ to a time $t_2$, and wherein the third period of time extends from one of: a) a time $t_0$ to a time $t_1$ where $t_0 < t_1 < t_2$ or b) a time $t_1$ to a time $t_2$ where $t_0 < t_1 < t_2$.

19. The computer system of claim of claim 17, wherein the first period of time extends from a time $t_0$ to a time $t_2$, and wherein the third period of time extends from one of: a) a time $t_0$ to a time $t_1$ where $t_0 < t_1 < t_2$ or b) a time $t_1$ to a time $t_3$ where $t_0 < t_1 < t_2$ and $t_3 > t_2$.

20. The computer system of claim of claim 11, wherein calculating the processing capability of the first processing component of the PCD over the first period of time comprises determining a first number of instructions that the first processing component is capable of processing over the first period of time at a first frequency.

21. A computer system for reducing thermal energy generation in a portable computing device ("PCD"), the system comprising:
means for detecting an increase in thermal energy generation on at least a first processing component of the PCD;
means for applying a thermal mitigation technique to reduce thermal energy resulting from leakage power ("PL") in response to detecting the increase in thermal energy generation on at least the first processing component of the PCD, the thermal mitigation technique comprising:
calculating a processing capability of the first processing component of the PCD over a first period of time; and
based on the calculated processing capability, setting a timer component of the PCD to trigger a forced power collapse that removes all power to the first processing component for a second period of time that is less than the first period of time.

22. The computer system of claim 21, wherein the first period of time extends from a time $t_0$ to a time $t_2$,
wherein the second period of time extends from one of: a) a time $t_0$ to a time $t_1$ where $t_0 < t_1 < t_2$ or b) a time $t_1$ to a time $t_2$ where $t_0 < t_1 < t_2$,
and wherein the processing capability is calculated at a first frequency that is provided to the first processing component, the first frequency associated with a full power rating of the first processing component.

23. The computer system of claim 22, further comprising:
means for modifying the first frequency provided to the first processing component to a second frequency for a third period of time that is less than the first period of time and different than the second period of time,
wherein the second frequency provided to the first processing component for the third period of time enables the first processing component to have a substantially equivalent processing capability over the third period of time as the calculated processing capability associated with the first frequency over the first period of time.

24. The computer system of claim 23, wherein providing the first frequency is associated with a temperature reading of the PCD.

25. The computer system of claim 22, further comprising:
means for modifying the first frequency provided to the first processing component to a second frequency for a third period of time that is less than the first period of time and different than the second period of time, wherein the second frequency provided to the first processing component for the third period of time enables the first processing component to have a higher processing capability over the third period of time than the calculated processing capability associated with the first frequency over the first period of time.

26. The computer system of claim 21, wherein the means for calculating the processing capability of the first processing component comprises means for calculating the number of instructions that the first processing component is capable of processing at the second frequency over a period of time $t_2$ to $t_4$; and further comprising:
means for providing a second frequency to the first processing component, wherein the modified given frequency enables the first processing component to process the calculated number of instructions over a third period of time that is less than the first period of time and different than the second period of time.

27. The computer system of claim 21, further comprising:
means for calculating a processing capability of a second processing component of the PCD over the first period of time; and
means for, based on the calculated processing capability, setting another timer component of the PCD to trigger a forced power collapse that removes all power to the second processing component for a third period of time that is different than the second period of time.

28. The computer system of claim 27, wherein the first period of time extends from a time $t_0$ to a time $t_2$, and wherein the third period of time extends from one of: a) a time $t_0$ to a time $t_1$ where $t_0 < t_1 < t_2$ or b) a time $t_1$ to a time $t_2$ where $t_0 < t_1 < t_2$.

29. The computer system of claim 27, wherein the first period of time extends from a time $t_0$ to a time $t_2$, and wherein the third period of time extends from one of: a) a time $t_0$ to a time $t_1$ where $t_0 < t_1 < t_2$ or b) a time $t_1$ to a time $t_3$ where $t_0 < t_1 < t_2$ and $t_3 > t_2$.

30. The computer system of claim 21, wherein calculating the processing capability of the first processing component of the PCD over the first period of time comprises determining a first number of instructions that the first processing component is capable of processing over the first period of time at a first frequency, and further comprising:
means for providing a second frequency to the first processing component, wherein the second frequency is selected to enable the first processing component to process the first number of instructions within the second period of time that is less than the first period of time.

31. A computer program product comprising a non-transitory computer usable medium having a computer readable program code embodied therein, said computer readable program code adapted to be executed to implement a method for reducing thermal energy generation in a portable computing device ("PCD"), said method comprising:
detecting an increase in thermal energy generation on at least a first processing component of the PCD;
applying a thermal mitigation technique to reduce thermal energy resulting from leakage power ("PL") in response to detecting the increase in thermal energy generation on at least the first processing component of the PCD, the thermal mitigation technique comprising:
- calculating a processing capability of the first processing component of the PCD over a first period of time; and
- based on the calculated processing capability, setting a timer component of the PCD to trigger a forced power collapse that removes all power to the first processing component for a second period of time that is less than the first period of time.

32. The computer program product of claim 31, wherein the first period of time extends from a time $t_0$ to a time $t_2$,
- wherein the second period of time extends from one of: a) a time $t_0$ to a time $t_1$ where $t_0 < t_1 < t_2$ or b) a time $t_1$ to a time $t_2$ where $t_0 < t_1 < t_2$,
- and wherein the processing capability is calculated at a first frequency that is provided to the first processing component, the first frequency associated with a full power rating of the first processing component.

33. The computer program product of claim 32, further comprising:
- modifying the first frequency provided to the first processing component to a second frequency for a third period of time that is less than the first period of time and different than the second period of time,
- wherein the second frequency provided to the first processing component for the third period of time enables the first processing component to process the calculated number of instructions over the third period of time.

34. The computer program product of claim 33, wherein providing the first frequency is associated with a temperature reading of the PCD.

35. The computer program product of claim 32, further comprising:
- modifying the first frequency provided to the first processing component to a second frequency for a third period of time that is less than the first period of time and different than the second period of time, wherein the second frequency provided to the first processing component for the third period of time enables the first processing component to have a higher processing capability over the third period of time than the calculated processing capability associated with the first frequency over the first period of time.

36. The computer program product of claim 31, wherein calculating the processing capability of the first processing component comprises calculating the number of instructions that the first processing component is capable of processing at a first frequency over the first period of time; and further comprising:
- providing a second frequency to the first processing component, wherein the second frequency enables the first processing component to process the calculated number of instructions over a third period of time that is less than the first period of time and different than the second period of time.

37. The computer program product of claim 31, further comprising:
- calculating a processing capability of a second processing component of the PCD over the first period of time; and
- based on the calculated processing capability, setting another timer component of the PCD to trigger a forced power collapse that removes all power to the second processing component for a third period of time that is different than the second period of time.

38. The computer program product of claim 37, wherein the first period of time extends from a time $t_0$ to a time $t_2$, and wherein the third period of time extends from one of: a) a time $t_0$ to a time $t_1$ where $t_0 < t_1 < t_2$ or b) a time $t_1$ to a time $t_2$ where $t_0 < t_1 < t_2$.

39. The computer program product of claim 37, wherein the first period of time extends from a time $t_0$ to a time $t_2$, and wherein the third period of time extends from one of: a) a time $t_0$ to a time $t_1$ where $t_0 < t_1 < t_2$ or b) a time $t_1$ to a time $t_3$ where $t_0 < t_1 < t_2$ and $t_3 > t_2$.

40. The computer program product of claim 31, wherein calculating the processing capability of the first processing component of the PCD over the first period of time comprises determining a first number of instructions that the first processing component is capable of processing over the first period of time at a first frequency, and further comprising:
- providing a second frequency to the first processing component, wherein the second frequency is selected to enable the first processing component to process the first number of instructions within a third period of time that is less than the first period of time.

* * * * *